(12) United States Patent
Yanagawa et al.

(10) Patent No.: US 8,383,304 B2
(45) Date of Patent: *Feb. 26, 2013

(54) GALLIUM PHTHALOCYANINE COMPOUND, AND IMAGE BEARING MEMBER, IMAGE FORMING METHOD, IMAGE FORMING APPARATUS, AND PROCESS CARTRIDGE USING THE GALLIUM PHTHALOCYANINE COMPOUND

(75) Inventors: Yoshiki Yanagawa, Shizuoka (JP); Masafumi Ohta, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 13/029,698

(22) Filed: Feb. 17, 2011

(65) Prior Publication Data

US 2011/0207043 A1    Aug. 25, 2011

(30) Foreign Application Priority Data

Feb. 24, 2010   (JP) .................................. 2010-038930
Feb. 24, 2010   (JP) .................................. 2010-039153

(51) Int. Cl.
*G03G 5/047* (2006.01)

(52) U.S. Cl. .................... 430/59.4; 430/123.4; 540/130; 399/111; 399/159

(58) Field of Classification Search ................. 430/59.4, 430/123.4; 540/130; 399/111, 159
See application file for complete search history.

(56) References Cited

U.S. PATENT DOCUMENTS

2003/0190540 A1 * 10/2003   Shoshi et al. .................... 430/78
2011/0159420 A1 *  6/2011   Sakaguchi et al. ............... 430/69

FOREIGN PATENT DOCUMENTS

EP          811506  * 12/1997
JP       05-096861  *  4/1993

(Continued)

OTHER PUBLICATIONS

Translation of JP 05-096861 published Apr. 1993.*

(Continued)

*Primary Examiner* — Peter Vajda
(74) *Attorney, Agent, or Firm* — Oblon, Spivak, McClelland, Maier & Neustadt, L.L.P.

(57) ABSTRACT

A gallium phthalocyanine compound represented by the following chemical structure I, Chemical structure I

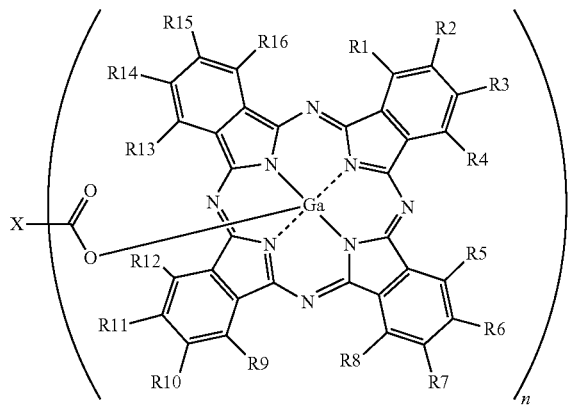

where X represents a substituted or non-substituted alkyl group, a substituted or non-substituted alkenyl group, a substituted or non-substituted alkynyl group, a substituted or non-substituted aralkyl group, a substituted or non-substituted cycloalkyl group, a substituted or non-substituted aryl group, or a hydrogen atom, where substitution groups thereof are an alkoxy group, an alkylthio group, an alkyl group, a halogen atom, nitro group, amino group, an aryl group, carboxylic group, and cyano group, R1 to R16 independently represent a hydrogen atom, an alkoxy group, an alkylthio group, an alkyl group, a halogen atom, nitro group, or aryl group, n represents an integer of from 1 to 3 but excluding a combination in which n is 1 and X is methyl group.

12 Claims, 3 Drawing Sheets

FOREIGN PATENT DOCUMENTS

| | | | |
|---|---|---|---|
| JP | 10-036828 | * | 2/1998 |
| JP | 2882977 | | 2/1999 |
| JP | 3123185 | | 10/2000 |
| JP | 3166293 | | 3/2001 |
| JP | 2001-323183 | | 11/2001 |
| JP | 2009-62475 | | 3/2009 |

OTHER PUBLICATIONS

Translation of JP 10-036828 published Feb. 1998.*

U.S. Appl. No. 12/978,787, filed Dec. 27, 2010, Sakaguchi et al.

* cited by examiner

GALLIUM PHTHALOCYANINE COMPOUND, AND IMAGE BEARING MEMBER, IMAGE FORMING METHOD, IMAGE FORMING APPARATUS, AND PROCESS CARTRIDGE USING THE GALLIUM PHTHALOCYANINE COMPOUND

BACKGROUND OF THE INVENTION

1. Field of the Invention

The present invention relates to gallium phthalocyanine compound, and an image bearing member, an image forming method, an image forming apparatus, and a process cartridge using the gallium phthalocyanine compound.

2. Description of the Background Art

Phthalocyanine compounds are widely used as electronic materials and in recent years have been widely studied for their applicability particularly in fields such as electrophotography, optical recording, and photoelectric conversion elements.

With regard to the electrophotography field, many phthalocyanine compounds having sensitivity in the near-infrared wavelength area of semi-conductor lasers have been studied and researched, in an effort to improve both the sensitivity of electrophotographic image bearing members and the stability thereof for an extended period of time with an emphasis on the crystal types of such phthalocyanine compounds.

In general, phthalocyanine compounds are known to have a variety of crystal types depending on manufacturing and processing methods. Such crystal types are also known to have significant impacts on photoelectric conversion efficiency and image bearing member stability over an extended period of time with repetitive use.

With regard to the phthalocyanine compound crystal types, for example, copper phthalocyanine has crystal types of α, π, χ, ρ, γ, δ, etc. in addition to stable β type. These crystal types are known to be mutually transitioned among them by mechanical external force, sulfuric acid treatment, organic solvent treatment, heat treatment, etc.

In addition, Japanese patent application publication nos. H05-98181 (hereinafter referred to as JP-H05-98181-A), JP-H05-263007-A, JP-HP-07-53892-A, JP-2009-62475-A, and JP-2001-323183-A describe gallium phthalocyanine compounds. However, hydroxy gallium phthalocyanine compounds described therein have generally extremely low solubility in organic solvents. Therefore, refinement is limited to washing by organic solvents. Thus, impurities are difficult to sufficiently remove.

In addition, many methods of synthesizing gallium phthalocyanine compounds using acid paste have been described but use strong sulfuric acid, which tends to cause problems in handling, limits the applicable range of pigments, and adversely impacts electrical characteristics of the image bearing member due to resolvents produced by strong sulfuric acid.

For these reasons, the present inventors recognize that a need exists for gallium phthalocyanine compounds that have a large solubility in organic solvents to improve the quality and stability of images produced by an image forming apparatus employing electrophotography (e.g., photocopier, laser printer), and an image bearing member, an image forming method, an image forming apparatus, and a process cartridge using the gallium phthalocyanine compounds.

SUMMARY OF THE INVENTION

Accordingly, an object of the present invention is to provide gallium phthalocyanine compounds that have a large solubility in organic solvents to improve the quality and stability of images produced by an image forming apparatus employing electrophotography (e.g., photocopier, laser printer), and an image bearing member, an image forming method, an image forming apparatus, and a process cartridge using the gallium phthalocyanine compounds.

Briefly, this object and other objects of the present invention as hereinafter described will become more readily apparent and can be attained, either individually or in combination thereof, by a gallium phthalocyanine compound represented by the following chemical structure I,

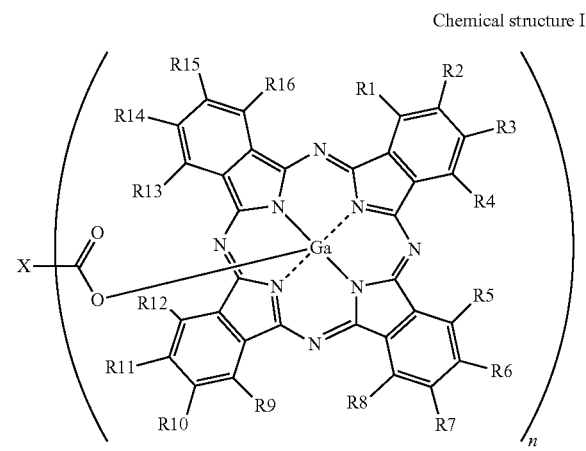

Chemical structure I where X represents a substituted or non-substituted alkyl group, a substituted or non-substituted alkenyl group, a substituted or non-substituted alkynyl group, a substituted or non-substituted aralkyl group, a substituted or non-substituted cycloalkyl group, a substituted or non-substituted aryl group, or a hydrogen atom, where substitution groups thereof are an alkoxy group, an alkylthio group, an alkyl group, a halogen atom, nitro group, amino group, an aryl group, carboxylic group, and cyano group, R1 to R16 independently represent a hydrogen atom, an alkoxy group, an alkylthio group, an alkyl group, a halogen atom, nitro group, or aryl group, n represents an integer of from 1 to 3 but excluding a combination of n is 1 and X is methyl group.

As another aspect of the present invention, an image bearing member is provided which includes an electroconductive substrate and a photosensitive layer provided overlying the electroconductive substrate, the photosensitive layer containing a charge generation material, which is the gallium phthalocyanine compound represented by Chemical structure I.

It is preferred that, in the image bearing member mentioned above, the charge generation material is obtained by reacting a halogenized gallium phthalocyanine or a hydroxy gallium phthalocyanine and a carboxylic acid derivative.

As another aspect of the present invention, an image forming method is provided which includes charging the image bearing member mentioned above, irradiating the image bearing member with light according to image data to form a latent electrostatic image on the image bearing member, developing the latent electrostatic image with a development agent comprising toner to obtain a visualized image, and transferring the visualized image onto a recording medium.

As another aspect of the present invention, an image forming apparatus is provided which includes the image bearing member mentioned above, a charger that charges the image bearing member, an irradiator that irradiates the image bearing member with light to form a latent electrostatic image on a surface of the image bearing member, a development device that develops the latent electrostatic image with a development agent comprising toner to obtain a visualized image, and a transfer device that transfers the visualized image onto a recording medium.

As another aspect of the present invention, a process cartridge is provided which includes the image bearing member mentioned above and at least one of a charger, an irradiator, a development device, and a cleaner.

As another aspect of the present invention, a gallium phthalocyanine compound represented by the following chemical structure II,

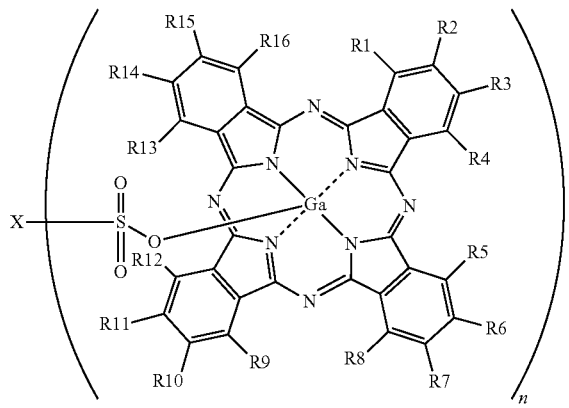

Where X represents a substituted or non-substituted alkyl group, a substituted or non-substituted alkenyl group, a substituted or non-substituted alkynyl group, a substituted or non-substituted aralkyl group, or a substituted or non-substituted aryl group, where substitution groups thereof an alkoxy group, an alkylthio group, an alkyl group, a halogen atom, nitro group, amino group, an aryl group, carboxylic group, and cyano group, R1 to R16 independently represent hydrogen atom, an alkoxy group, an alkylthio group, an alkyl group, a halogen atom, nitro group, or aryl group, and n represents an integer of from 1 or 2.

As another aspect of the present invention, an image bearing member is provided which includes an electroconductive substrate and a photosensitive layer provided overlying the electroconductive substrate, the photosensitive layer containing a charge generation material, which is the gallium phthalocyanine compound represented by Chemical structure II.

It is preferred that, in the image bearing member mentioned above, the charge generation material is obtained by reacting a halogenized gallium phthalocyanine or a hydroxy gallium phthalocyanine and a carboxylic acid derivative.

As another aspect of the present invention, an image forming method is provided which includes charging the image bearing member containing the gallium phthalocyanine compound represented by Chemical structure II, irradiating the image bearing member with light according to image data to form a latent electrostatic image on the image bearing member, developing the latent electrostatic image with a development agent comprising toner to obtain a visualized image, and transferring the visualized image onto a recording medium.

As another aspect of the present invention, an image forming apparatus is provided which includes the image bearing member containing the gallium phthalocyanine compound represented by Chemical structure II, a charger that charges the image bearing member, an irradiator that irradiates the image bearing member with light to form a latent electrostatic image on a surface of the image bearing member, a development device that develops the latent electrostatic image with a development agent comprising toner to obtain a visualized image, and a transfer device that transfers the visualized image onto a recording medium.

As another aspect of the present invention, a process cartridge is provided which includes the image bearing member containing the gallium phthalocyanine compound represented by Chemical structure II and at least one of a charger, an irradiator, a development device, and a cleaner.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE PRESENT DISCLOSURE

Figure 1:
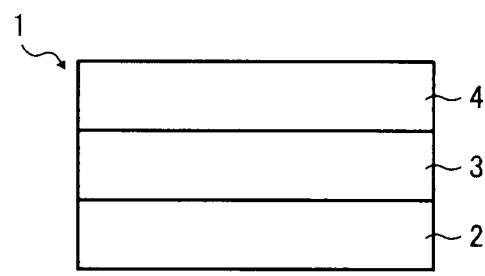
FIG. 1 is a schematic cross section illustrating an example of the image bearing member of the present disclosure.

Gallium phthalocyanine compounds of the present disclosure represented by the following chemical structure 1 are described below.

Chemical structure I

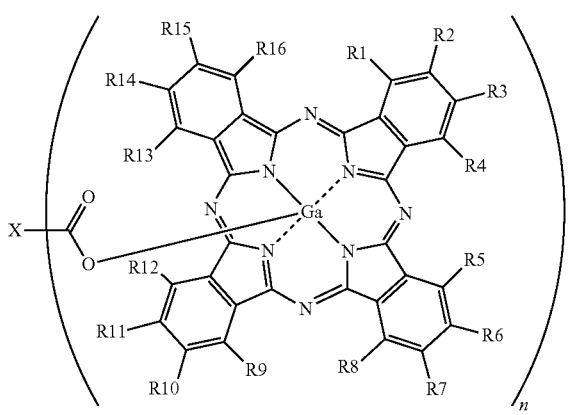

In the chemical structure I, X represents a substituted or non-substituted alkyl group, a substituted or non-substituted alkenyl group, a substituted or non-substituted alkynyl group, a substituted or non-substituted aralkyl group, a substituted or non-substituted cycloalkyl group, a substituted or non-substituted aryl group, or a hydrogen atom.

Specific examples of the substitution groups include, but are not limited to, an alkoxy group, an alkylthio group, an alkyl group, a halogen atom, nitro group, amino group, an aryl group, carboxylic group, and cyano group.

R1 to R16 independently represent a hydrogen atom, an alkoxy group, an alkylthio group, an alkyl group, a halogen atom, a nitro group, or an aryl group. n represents an integer of from 1 to 3 but excluding a combination in which n is 1 and X is methyl group.

Among these, in terms of photoelectric conversion efficiency, the gallium phthalocyanine compound represented by the following chemical structure I-A is particularly preferable as the electrophotography photosensitive material.

Chemical structure I-A

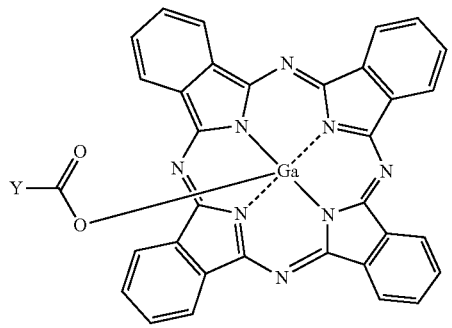

In the chemical structure I-A, Y represents a substituted or non-substituted alkyl group (excluding methyl group), a substituted or non-substituted alkenyl group, a substituted or non-substituted alkynyl group, a substituted or non-substituted aralkyl group, a substituted or non-substituted cycloalkyl group, a substituted or non-substituted aryl group, or a hydrogen atom.

Specific examples of the substitution groups include, but are not limited to, an alkoxy group, an alkylthio group, an alkyl group, a halogen atom, nitro group, amino group, an aryl group, carboxylic group, and cyano group.

Gallium phthalocyanine compounds of the present disclosure represented by the following chemical structure II are described below.

Chemical structure II

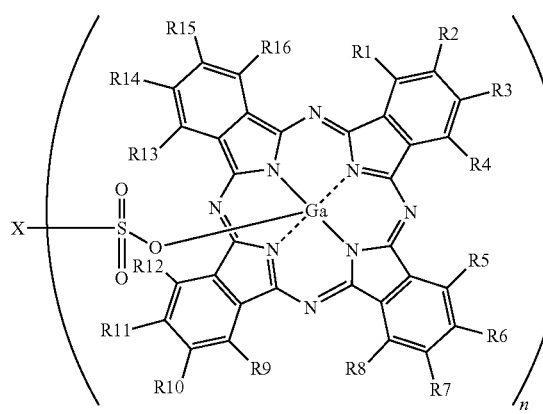

In the chemical structure II, X represents a substituted or non-substituted alkyl group, a substituted or non-substituted alkenyl group, a substituted or non-substituted alkynyl group, a substituted or non-substituted aralkyl group, or a substituted or non-substituted aryl group.

Specific examples of the substitution groups include, but are not limited to, an alkoxy group, an alkylthio group, an alkyl group, a halogen atom, nitro group, amino group, an aryl group, carboxylic group, and cyano group.

R1 to R16 independently represent hydrogen atom, an alkoxy group, an alkylthio group, an alkyl group, a halogen atom, nitro group, or aryl group. n represents an integer of from 1 or 2.

Among these, in terms of photoelectric conversion efficiency, gallium phthalocyanine compound represented by the following chemical structure II-A is particularly preferable as the electrophotography photosensitive material.

Chemical structure II-A

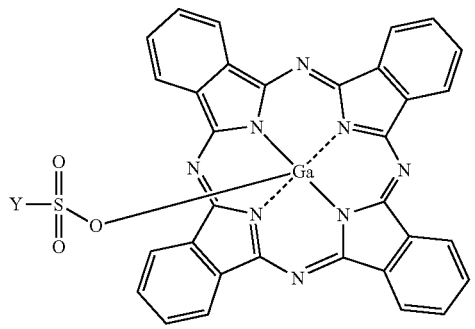

In the chemical structure II-A, Y represents a substituted or non-substituted alkyl group, a substituted or non-substituted alkenyl group, a substituted or non-substituted alkynyl group, a substituted or non-substituted aralkyl group, or a substituted or non-substituted aryl group.

Specific examples of the substitution groups include, but are not limited to, an alkoxy group, an alkylthio group, an alkyl group, a halogen atom, nitro group, amino group, an aryl group, carboxylic group, and cyano group.

Gallium phthalocyanine compounds of the present disclosure can be synthesized by reacting halogenized gallium phthalocyanine or hydroxy gallium phthalocyanine and a carboxylic acid derivative in an organic solvent.

Specific examples of halogenized gallium phthalocyanines include, but are not limited to, chlorogallium phthalocyanine, bromogallium phthalocyanine, and iodine gallium phthalocyanine. These can be synthesized by any known method.

For example, chlorogallium phthalocyanine can be synthesized by a method of reacting gallium trichloride and diimino isoindoline, which is described in D.C. Acad. Sci., (1965), 242, 1026.

Bromogallium phthalocyanine can be synthesized by a method of reacting gallium tribromide and phthalonitrile, which is described in JP-S59-133551-A.

Iodine gallium phthalocyanine can be synthesized by a method of reacting gallium triiodide and phthalonitrile, which is described in JP-S60-59354-A.

Hydroxy gallium phthalocyanine can be obtained by hydrolyzing the halogenized gallium phthalocyanine mentioned above. Both acid hydrolysis and alkali hydrolysis are suitable.

Acid hydrolysis is used in the method described in Bull. Soc. Chim. France, 23 (1962) in which chlorogallium phthalocyanine is hydrolyzed by using sulfuric acid.

Alkali hydrolysis is used in the method described in Inrog. Chem. (19), 3131, (1980) in which ammonium is used.

Although gallium phthalocyanine compounds of the present disclosure are synthesized by reacting the thus-obtained halogenized gallium phthalocyanine compound or a hydroxy gallium phthalocyanine compound and a carboxylic acid compound or a sulfonic acid compound, halogenized gallium phthalocyanine is preferable.

This is ascribable to the manufacturing method as described above. In the manufacturing method of hydroxy gallium phthalocyanine, resolvents are inevitably produced in the hydrolysis treatment using acid or alkali.

To the contrary, the halogenized gallium phthalocyanine compound can be manufactured without hydrolysis treatment. Therefore, no resolvents are produced as the synthesis material in the present disclosure, and in addition, halogenized gallium phthalocyanine can be produced through a less number of processes.

Any known product that contains a carboxylic group in the molecular structure such as an organic aliphatic acid, a resin having a high acid number, or a copolymer can be used as the carboxylic acid compounds in the present disclosure.

Specific examples thereof include, but are not limited to, pentafluorobenzoic acid, tetrafluorobenzoic acid, cyclohexane carboxylic acid, cyclopentyl acetic acid, cyclopentane carboxylic acid, cyclohexylacetic acid, cyclopentyl maronic acid, cyclohexane-1,2-dicarboxylic acid, 3-cyclohexane-1-carboxylic acid, 1,4-cyclohexane dicarboxylic acid, 1,2-cyclohexane dicarboxylic acid, 3-trifluoromethyl benzoic acid, 3,5-bistrifluoro methyl benzoic acid, 4-methyl benzoic acid, 3-methyl benzoic acid, 4-methoxy benzoic acid, 4-nitro benzoic acid, 4-cyano benzoic acid, picolinic acid, nicotinic acid, isonicotinic acid, 2,3-pyridine dicarboxylic acid, nonadecafluoro decanoic acid, hexadecafluor sebacic acid, hexafluoroglutaric acid, chlorodifluoro acetic acid, trichloro acetic acid, tribromo acetic acid, trifluoro acetic acid, difluoro acetic acid, fluoro acetic acid, dichloro acetic acid, acrylic acid, methacrylic acid, pivalic acid, nonafluoro valeric acid, n-valeric acid, pentafluoro propionic acid, heptafluoro butylic acid, undecafluoro hexanoic acid, tert-butyl acetic acid, 2,2-dimethylbutylic acid, tri-decafluoro heptanoic acid, pentadecafluoro octanoic acid, heptadecafluorononaoic acid, 1,2,3-propane tricarboxylic acid, trimesic acid, 1,9-nonane dicarboxylic acid, adipic acid, azelaic acid, dodecane dioic acid, eicosanic dioic acid, glutaric acid, heptadecane dioic acid, hexadecane dioic acid, maronic acid, nonadecane dioic acid, octadecane dioic, acid, pentadecane dioic acid, pimelic acid, sebacic acid, suberic acid, succinic acid, tetradecane dioic acid, tridecane dioic acid, acid anhydrides thereof, and acid halogentite thereof.

In addition, with regard to the molar ratio of a halogenized gallium phthalocyanine compound or a hydroxy gallium phthalocyanine compound and a carboxylic acid derivative, the molar ratio of the carboxylic acid derivative is about a half mol when n of the chemical structure I is 2 and about a one-third mol when n of the chemical structure I is 3.

When n of the chemical structure I is 1, the compound represented by the chemical structure I-A is suitably an equal mol or more. Depending on the reaction property of used carboxylic acid derivatives, the molar ratio of 1.1 time mol to 500 time mol is suitable.

In addition, a carboxylic acid derivative that is liquid at a reaction temperature can be used as a reaction solvent.

Specific examples of the sulfonic acid compounds include, but are not limited to, methane sulfonic acid, ethane sulfonic acid, butane sulfonic acid, pentane sulfonic acid, hexane sulfonic acid, heptane sulfonic acid, octane sulfonic acid, hexadecane sulfonic acid, trifluoromethane sulfonic acid, nonafluoro-1-butane sulfonic acid, heptadecafluoro octane sulfonic acid, 2-chloroethane sulfonic acid, 2-bromoethane sulfonic acid, vinyl sulfonic acid, benzene sulfonic acid, p-toluene sulfonic acid, p-chlorobenzene sulfonic acid, nitrobenzene sulfonic acid, pyridine sulfonic acid, 1-naphthalene sulfonic acid, 4-amino naphthalene-1-sulfonic acid, anthraquinone-2-sulfonic acid, 1,3-benzene disulfonic acid, 1,5-naphthalene disulfonic acid, 1,3-propane disulfonic acid, and 1,4-butane disulfonic acid.

With regard to the molar ratio of a halogenized gallium phthalocyanine compound or a hydroxy gallium phthalocyanine compound and a sulfonic acid derivative, the molar ratio of the sulfonic acid derivative is about a half mol when n of the chemical structure II is 2.

When n of the chemical structure II is 1, the compound represented by the chemical structure II-A is suitably an equal mol or more. Depending on the reaction property of the used sulfonic acid derivative, the molar ratio of 1.1 time mol to 500 time mol is suitable.

In addition, a sulfonic acid derivative that is liquid at the reaction temperature is used as a reaction solvent.

Specific examples of the organic solvents include, but are not limited to, dimethyl sulfoxide, N,N-dimethyl formaldehyde, N,N-dimethyl acetoamide, tetrahydrofuran, dioxane, 2-butanone, cyclohexanone, monochlorobenzene, dichlorobenzene, toluene, xylene, anisole, nitrobenzene, ethylene glycol methylether, ethylene glycol ethylether, ethyl acetate, butyl acetate, dichloroethane, trichloroethane, pyridine, picoline, and quinoline.

The reaction temperature is from 0° C. to 200° C. and preferably from 20° C. to 150° C. and the target product is synthesized by reaction for 30 minutes to 50 hours.

In the present disclosure, gallium phthalocyanine compound represented by the chemical structure I has a large solubility in an organic solvent. Specific examples of such organic solvents include, but are not limited to, ether-based solvents such as tetrahydrofuran and dioxane, glycol ether-based solvents such as ethylene glycol methylether and ethylene glycol ethylether, N,N-dimethylformamide, N,N-dimethylacetoamide, ethylcellosolve, ethyl acetate, butyl acetate, dichloromethane, chloroform, carbon tetrachloride, dichloroethane, monochlorobenzene, dichlorobenzene, toluene, xylene, anisole, n-hexane, cyclohexane, cyclohexanone, nitrobenzene, pyridine, picoline, quinoline, and liquid mixtures thereof.

In addition, such a solution is preferably subject to adsorption treatment by silica gel, alumina, florisil, activated carbon, activated earth, diatom earth, and perlite.

Specific examples of the adsorption methods include, but are not limited to, column chromatography and a method in which an adsorbent is added at room temperature or during heating followed by filtration.

In addition, this treatment is more efficiently conducted in combination with re-crystallization.

The gallium phthalocyanine compound represented by the Chemical structure (I) or (II) has a large solubility in an organic solvent. Therefore, refining treatment by re-crystallization or adsorption treatment using silica gel and alumina is possible to obtain a charge generation material having impurities in a less amount. In addition, the target product can be prepared without acid paste treatment using sulfuric acid, which also contributes to production of a product having impurities in a less amount. Therefore, the gallium phthalocyanine compound represented by the Chemical structure (I) or (II) are excellent as a charge generation material for use in an image bearing member.

The structure of the image bearing member in the present disclosure is described in detail with reference to the accompanying drawings.

As illustrated in FIG. 1, an image bearing member 1 of the present disclosure employs a structure in which a charge generation layer 3 mainly made of a charge generation material is provided on an electroconductive substrate 2 and a charge transport layer 4 mainly made of a charge transport material is laminated on the charge generation layer.

Figure 2:
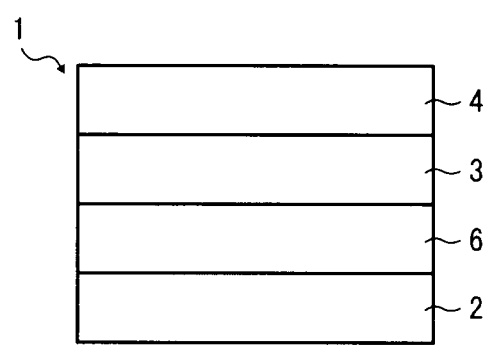
FIG. 2 is a schematic cross section illustrating another example of the image bearing member of the present disclosure.

As illustrated in FIG. 2, an undercoating layer 6 or an intermediate layer is optionally provided between the electroconductive substrate 2 and the charge generation layer 3.

Figure 3:
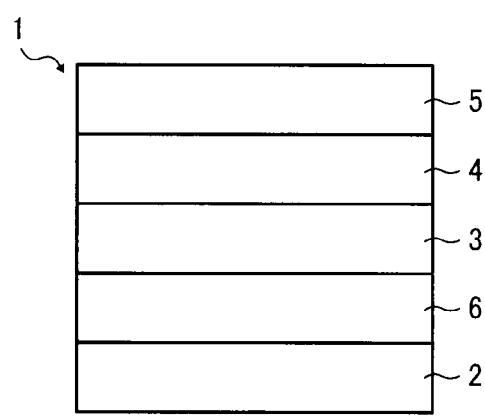
FIG. 3 is a schematic cross section illustrating another example of the image bearing member of the present disclosure.

In addition, as illustrated in FIG. 3, the image bearing member 1 of the present disclosure may have a protection layer 5 on the charge transport layer 4.

Figure 4:
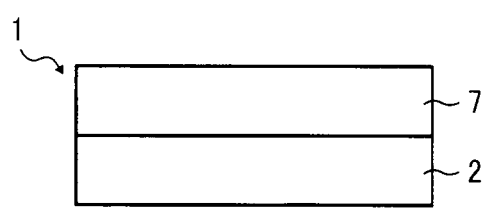
FIG. 4 is a schematic cross section illustrating another example of the image bearing member of the present disclosure.

Furthermore, the image bearing member 1 of the present disclosure employs a structure having a single layer type photosensitive layer 7 formed of a photosensitive layer containing a charge generation material and a charge transport material which is provided on the electroconductive substrate 2 as illustrated in FIG. 4.

Electroconductive Substrate

The electroconductive substrate 301 can be formed by using material having a volume resistance of not greater than 1010 Ω·cm. For example, there can be used plastic or paper having a film form or cylindrical form covered with metal such as aluminum, nickel, chrome, nichrome, copper, gold, silver, and platinum, or a metal oxide such as tin oxide and indium oxide by depositing or sputtering. Also a board formed of aluminum, an aluminum alloy, nickel, and a stainless metal can be used. Furthermore, a tube which is manufactured from the board mentioned above by a crafting technique such as extruding and extracting and surface-treatment such as cutting, super finishing and grinding is also usable.

In addition, endless nickel belts and endless stainless belts can be also used as the electroconductive substrate.

An electroconductive substrate formed by applying to the substrate mentioned above a liquid application in which electroconductive powder is dispersed in a suitable binder resin can be used as the electroconductive substrate for use in the present disclosure.

Specific examples of such electroconductive powders include, but are not limited to, carbon black, acetylene black, metal powder, such as powder of aluminum, nickel, iron, nichrome, copper, zinc and silver, and metal oxide powder, such as electroconductive tin oxide powder and ITO powder.

Specific examples of the binder resins which are used together with the electroconductive powder include, but are not limited to, thermoplastic resins, thermosetting resins, and optical curing resins, such as a polystyrene, a styrene-acrylonitrile copolymer, a styrene-butadiene copolymer, a styrene-anhydride maleic acid copolymer, a polyester, a polyvinyl chloride, a vinyl chloride-vinyl acetate copolymer, a polyvinyl acetate, a polyvinylidene chloride, a polyarylate (PAR) resin, a phenoxy resin, polycarbonate, a cellulose acetate resin, an ethyl cellulose resin, a polyvinyl butyral, a polyvinyl formal, a polyvinyl toluene, a poly-N-vinyl carbazole, an acrylic resin, a silicone resin, an epoxy resin, a melamine resin, an urethane resin, a phenol resin, and an alkyd resin.

Such an electroconductive layer can be formed by dispersing the electroconductive powder and the binder resins mentioned above in a suitable solvent, for example, tetrahydrofuran (THF), dichloromethane (MDC), methyl ethyl ketone (MEK), and toluene and applying the resultant to an electroconductive substrate.

In addition, an electroconductive substrate formed by providing a heat contraction tube as an electroconductive layer on a suitable cylindrical substrate can be used as the electroconductive substrate in the present disclosure. The heat contraction tube is formed of a material such as polyvinyl chloride, polypropylene, polyester, polystyrene, polyvinylidene chloride, polyethylene, chloride rubber, and polytetrafluoroethylene-based fluorine resin and the electroconductive powder mentioned above contained in the material.

Photosensitive Layer

Next, the photosensitive layer is described.

The photosensitive layer having a laminate structure is formed of at least a charge generation layer and a charge transport layer laminated on the charge generation layer.

Charge Generation Layer

The charge generation layer of the present disclosure is formed by applying a liquid application in which a charge generation material containing at least the gallium phthalocyanine compound represented by the chemical structure I and an optional binder resin are dissolved or dispersed in a solvent to an electroconductive substrate, an undercoating layer, or an intermediate layer followed by drying.

Specific examples of the binder resin used in the charge generation layer include, but are not limited to, polyamides, polyurethanes, epoxy resins, polyketones, polycarbonates, silicone resins, acrylic resins, polyvinylbutyrals, polyvinylformals, polyvinyl ketones, polystyrenes, polysulfone, poly-N-vinylcarbazoles, polyacrylamides, polyvinyl benzale, polyester, phenoxy resin, copolymer of vinylchloride and vinyl acetate, polyvinyl acetate, polyphenylene oxide, polyamide, polyvinylpyridine, cellulose-based resin, casein, polyvinyl alcohol, and polyvinyl pyrolidone.

The content of the binder resin is from 0 to 500 parts by weight and preferably from 10 to 300 parts by weight based on 100 parts by weight of the charge generation material.

Specific examples of the solvents for use in forming the charge generation layer include, but are not limited to, known organic solvents such as isopropanol, acetone, methylethylketone, cyclohexanone, tetrahydrofuran, dioxane, ethylcellosolve, ethyl acetate, methylacetate, dichloromethane, dichloroethane, monochlorobenzene, cyclohexane, toluene, xylene, and ligroin. Among these, ketone based solvents, ester based solvents, and ether based solvents are particularly preferable.

These can be used alone or as a mixture of two or more.

Charge generation materials (pigments) for use in the present disclosure are optionally dispersed to adjust the crystal type.

The charge generation pigment is dissolved with an optional binder resin in a suitable solvent followed by dispersion using a ball mill, an attritor, a sand mill, or ultrasonic.

The optional binder resin can be added before or after dispersion of the charge generation material.

The liquid application of the charge generation layer is mainly formed of a charge generation material, a solvent, and a binder resin and may also contain additives such as a sensitizer, a dispersion agent, a surface active agent, and silicone oil.

Known methods such as a dip coating method, a spray coating method, a bead coating method, a nozzle coating method, a spinner coating method, and a ring coating method can be used to apply the charge generation layer using the liquid application described above.

The charge generation layer preferably has a thickness of from about 0.01 to about 5 μm and more preferably from 0.1 to 2 μm.

After the application, the charge generation layer is heated and dried by an oven, etc.

The drying temperature of the charge generation layer in the present disclosure is preferably from 50° C. to 160° C. and more preferably from 80° C. to 140° C.

Charge Transport Layer

Next, the charge transport layer is described.

The charge transport layer is formed by applying and drying a liquid application in which a charge transport material and a binder resin are dissolved or dispersed in a solvent.

In addition, an additive such as a plasticizer, a leveling agent, anti-oxidizer, and a lubricant can be optionally added to the liquid application of the charge transport layer. These can be used alone or in combination.

The charge transport material is classified into a positive hole transport material and an electron transport material.

Specific examples of the positive hole transport materials include, but are not limited to, poly-N-vinylvarbazole) and derivatives thereof, poly-γ-carbzoyl ethylglutamate) and derivatives thereof, pyrenne-formaldehyde condensation products and derivatives thereof, polyvinylpyrene, polyvinyl phnanthrene, polysilane, oxazole derivatives, oxadiazole derivatives, imidazole derivatives, monoaryl amine derivatives, diaryl amine derivatives, triaryl amine derivatives, stilbene derivatives, α-phenyl stilbene derivatives, benzidine derivatives, diaryl methane derivatives, triaryl methane derivatives, 9-styryl anthracene derivatives, pyrazoline derivatives, divinyl benzene derivatives, hydrazone derivatives, indene derivatives, butadiene derivatives, pyrene derivatives, bisstilbene derivatives, enamine derivatives, and other known materials.

These charge transport materials may be used alone or in combination.

Specific examples of such electron transport material include, but are not limited to, electron acceptance material such as chloranil, bromanil, tetracyano ethylene, tetracyanoquino dimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-4H-indeno[1,2-b]thiophene-4-one, 1,3,7-trinitrodibenzothhiophene-5,5-dioxide, and benzoquinone derivatives.

These charge transport materials may be used alone or in combination.

The content of the charge transport material is from 20 to 300 parts by weight and preferably from 40 to 150 parts by weight based on 100 parts by weight of the binder resin.

Specific examples of the binder resins contained in the charge transport layer include, but are not limited to, thermoplastic resins, or thermosetting resins, such as a polystyrene, a styrene-acrylonitrile copolymer, a styrene-butadiene copolymer, a styrene-anhydride maleic acid copolymer, a polyester, a polyvinyl chloride, a vinyl chloride-vinyl acetate copolymer, a polyvinyl acetate, a polyvinylidene chloride, a polyarylate (PAR) resin, a phenoxy resin, polycarbonate, a cellulose acetate resin, an ethyl cellulose resin, a polyvinyl butyral, a polyvinyl formal, a polyvinyl toluene, a poly(N-vinyl carbazole), an acrylic resin, a silicone resin, an epoxy resin, a melamine resin, an urethane resin, a phenol resin, and an alkyd resin.

Specific examples of the solvent for use in the liquid application for the charge transport layer include, but are not limited to, tetrahydrofuran, dioxane, toluene, dichloromethane, monochlorobenzene, dichloroethane, cyclohexanone, methylethylketone, and acetone.

Among these, non-halogen-based solvents are preferably used in terms of reduction of the burden on the environment.

Suitable specific examples thereof include, but are not limited to, ring ethers such as tetrahydrofuran, dioxolan, and dioxane, aromatic hydrocarbons such as toluene and xylene, and derivatives thereof. These can be used alone or in combination.

The thickness of the charge transport layer is preferably from 10 μm to 50 μm and more preferably from 15 μm to 35 μm in terms of the resolution and responsiveness.

Known methods such as a dip coating method, a spray coating method, a bead coating method, a nozzle coating method, a spinner coating method, and a ring coating method can be used as the method of applying the charge transport layer. Among these, the dip coating method using a liquid having a high viscosity is preferable because the charge transport layer is preferable to have a considerable thickness.

The charge transport layer after application is heated and dried by a heating device for use in forming the charge generation layer.

The drying temperature of the charge transport layer varies depending on the kind of the solvent contained in the liquid application of the charge transport layer and is preferably from 80° C. to 200° C. and more preferably from 110° C. to 170° C.

The drying time is preferably from 10 minutes or longer and more preferably 20 minutes or longer.

Single Layer

A photosensitive layer having a single layer structure is described next.

The charge generation material and the charge transport material are dispersed or dissolved in a binder resin to obtain an image bearing member having both a charge generation function and a charge transport function in a single layer.

The photosensitive layer can be formed by dissolving and/or dispersing the charge generation material, the charge transport material, and the binder resin in a solvent such as tetrahydrofuran, dioxane, dichloroethane, methylethylketone, cyclohexane, cyclohexanone, toluene, and xylene followed by application using a known method such as a spray coating method, a bead coating method, and a ring coating method.

The charge transport material preferably contains both the positive hole transport material and the electron transport material mentioned above.

In addition, a plasticizing agent, a leveling agent, an anti-oxidizing agent, etc. can be added, if desired.

With regard to the charge generation material, the charge transport material, the binder resin, the organic solvent, and various kinds of additives for use in the photosensitive layer having a single layer structure type, any of the materials contained in the charge generation layer and the charge transport layer described above can be used.

In addition to the binder resin specified for the charge transport layer, the binder resin specified for the charge generation layer can be mixed therewith for use.

The content of the charge generation material is preferably from 5 to 40 parts by weight and more preferably from 10 to 30 based on 100 parts by weight of the binder resin.

The content of the charge transport material is preferably from 0 to 190 parts by weight and more preferably from 50 to 150 parts by weight.

The thickness of the photosensitive layer is preferably from 5 μm to 40 μm and more preferably from 10 μm to 30 μm.

Undercoating Layer

In the image bearing member of the present disclosure, an undercoating layer can be provided between the electroconductive substrate and the photosensitive layer.

Typically, such an undercoating layer is mainly made of a resin. Considering that the photosensitive layer is applied to such an undercoating layer (i.e., resin) using a solvent, the resin is preferably hardly soluble in a known organic solvent.

Specific examples of such resins include, but are not limited to, water soluble resins such as polyvinyl alcohol, casein, and sodium polyacrylate, alcohol soluble resins such as copolymerized nylon and methoxymethylized nylon, and curing resins which form a three dimension mesh structure such as polyurethane, melamine resins, phenol resins, alkyd-melamine resins, isocyanate, and epoxy resins.

In addition, fine powder pigments of a metal oxide such as titanium oxides, silica, alumina, zirconium oxides, tin oxides and indium oxides can be added to the undercoating layer to prevent moiré and reduce the residual voltage.

As in the case of the charge generation layer and the charge transport layer described above, the undercoating layer can be formed by using a suitable solvent and an application method.

Silane coupling agents, titanium coupling agents, and chromium coupling agents can be used as the undercoating layer.

Protection Layer

In the present disclosure, a protection layer can be provided on the uppermost surface layer to improve the abrasion resistance of the image bearing member.

A charge transport polymer type in which a charge transport component and a binder resin are polymerized, a filler dispersion type in which a filler is dispersed, and a curing type in which a component having a reaction function group is cured are known as the protection layer. Any of the known protection layers can be used in the present disclosure.

Image Forming Apparatus

The electrophotography and the image forming apparatus of the present disclosure are described next with reference to the accompanying drawings.

Figure 5:
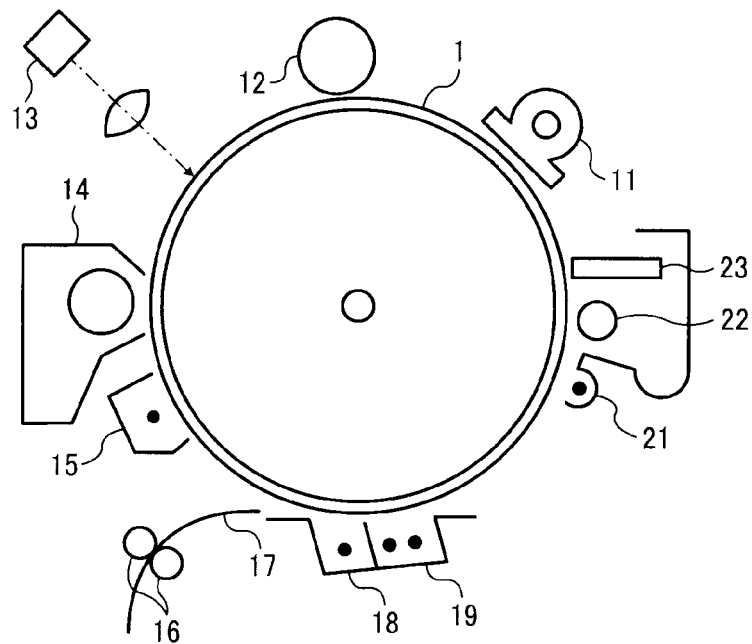
FIG. 5 is a schematic diagram illustrating an example of electrophotography process and image forming apparatus of the present disclosure.

FIG. 5 is a schematic diagram illustrating the electrophotography process and the image forming apparatus and the following examples are within the scope of the present disclosure.

Although an image bearing member 1 has a drum form in FIG. 5, it may employ a sheet or endless belt form.

A charging member such as a charging roller and a charging brush and any other known devices in addition to a corotron, a scorotron, and a solid state charger can be used as a charging roller 12, a pre-transfer charger 15, a transfer charger 18, a separation charger 19, and a pre-cleaning charger 21.

The charging member generally employs a non-contact charging system such as corona charging or a contact charging system using a charging member having a roller or a brush. Any of them can be suitably used in the present disclosure.

In particular, the charging roller is possible to significantly reduce the production amount of ozone in comparison with a corotron or a scorotron so that it is suitable in terms of stability and prevention of deterioration of image quality during repetitive use of the image bearing member.

However, since the image bearing member and the charging roller are in contact with each other, the charging roller is contaminated over repetitive use, which has an adverse impact on the image bearing member, thereby promoting production of abnormal images and deterioration of the abrasion resistance.

Reducing the contamination of the charging roller is particularly preferable for an image bearing member having a good abrasion resistance because the surface thereof is hardly scraped off.

Figure 6:
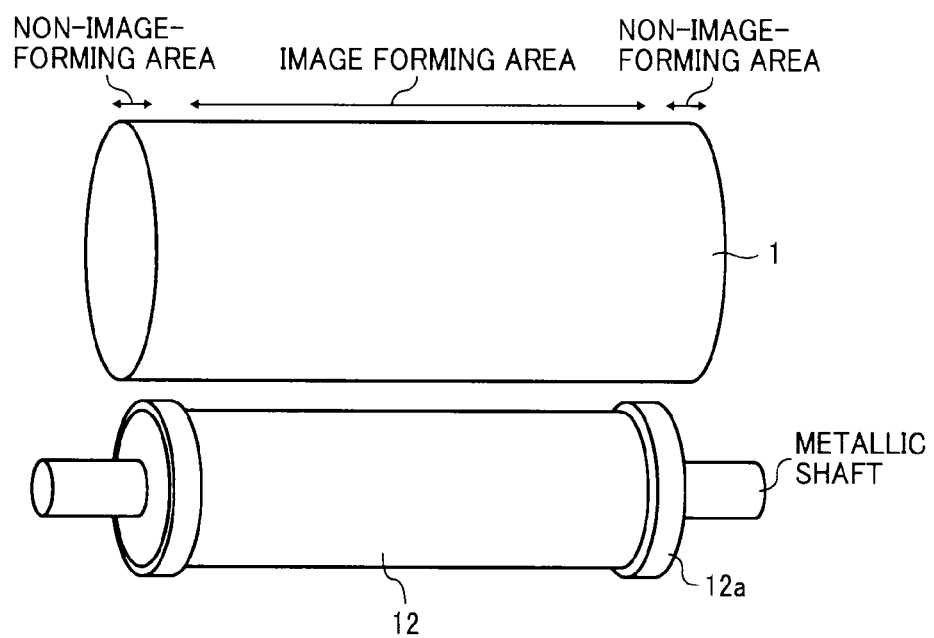
FIG. 6 is a schematic diagram illustrating an example of the charging device for use in the image forming apparatus of the present disclosure.

Therefore, as illustrated in FIG. 6, a gap formation member 12a is provided to the charging roller 12 so that the charging roller 12 and the image bearing member 1 are arranged in the vicinity of each other with a gap therebetween. Therefore, contaminated materials are hardly attached to the charging roller 12 or easily removed, resulting in reduction of the impact of the contaminated materials.

It is preferable that the gap between the image bearing member 1 and the charging roller 12 is small. For example, the gap is preferably 100 μm or less and more preferably 50 μm or less.

However, discharging is not uniform because the image bearing member 1 and the charging roller 12 are not in contact with each other, which leads to unstable charging of the image bearing member 1.

Therefore, for example, it is suitable to overlap an AC component with a DC component to maintain the stability of charging, thereby reducing the impact of ozone, contamination of the charging roller, and the chargeability.

Typical illumination devices, for example, a fluorescent lamp, a tungsten lamp, a halogen lamp, a mercury lamp, a sodium lamp, a light emitting diode (LED), a semiconductor laser (LD), and electroluminescence (EL) can be used as the light source for the irradiator 13 and a discharging lamp 11 illustrated in FIG. 5.

Among these, light emitting diodes (LED) and semiconductor lasers (LD) are commonly used.

Various kinds of optical filters, for example, a sharp cut filter, a band-pass filter, a near infrared filter, a dichroic filter, a coherent filter and a color conversion filter, can be used to irradiate an image bearing member with light having entirely a particular wavelength.

The irradiation can be conducted for the image bearing member 1 at a timing in processes such as the transfer process, the discharging process, and the cleaning process in combination and can be conducted in a process provided prior to irradiation of light.

However, irradiation of the image bearing member 1 in the discharging process significantly fatigues the image bearing member 1, which easily leads to reduction of charging and an increase in the residual voltage.

Therefore, it is suitable in some cases to discharge the image bearing member 1 by another method such as applying a reversed bias in the charging process or the cleaning process instead of discharging by irradiation in terms of improving the durability of the image bearing member.

When the image bearing member 1 is positively (or negatively) charged and irradiated according to image data, a positive (or negative) latent electrostatic image is formed on the image bearing member 1.

When the latent electrostatic image is developed with a negatively (or positively) charged toner (volt-detecting fine particles), a positive image is formed. When the latent electrostatic image is developed using a positively (or negatively) charged toner, a negative image is formed.

Any known method can be applied to such a development device and also a discharging device.

Typically, the chargers described above can be used as the transfer device. A combinational use of a transfer charger 18 and a separation charger 19 illustrated in FIG. 5 is preferable.

Although toner images are directly transferred from the image bearing member 1 to paper (recording medium) by using such a transfer device, toner images on the image bearing member 1 are preferably transferred to paper via an intermediate transfer body, which is referred to as an intermediate transfer system, in the present disclosure in terms of durability of the image bearing member 1 and improvement on the quality of image.

Among the contamination materials attached to the surface of the image bearing member 1, discharging product produced by charging and external additives contained in the toner are easily affected by moisture condition, which causes production of abnormal images. In addition, paper dust tends to degrade the durability of the image bearing member 1 and cause non-uniform abrasion in addition to such production of abnormal images.

Therefore, a structure in which the image bearing member 1 do not directly contact with paper is preferable in terms of improvement of the quality of image.

In addition, the intermediate transfer system is particularly suitable for an image forming apparatus that can produce full color images. That is, in this system, multiple toner images are temporarily transferred to and overlapped on the intermediate transfer body, which is advantageous in terms of controlling prevention of color misalignment and improvement of the quality of image. However, in the intermediate transfer system, scanning is repeated four times to obtain a single full color image, which is disadvantageous in terms of the durability of the image bearing member.

The image bearing member in the present disclosure produces images almost free from image blur even without a drum heater. Therefore, the image bearing member is easily and preferably used in an image forming apparatus employing the intermediate transfer system.

The intermediate transfer body is made of various kinds of materials and can have various kinds of forms such as a drum and a belt. Any known intermediate transfer body can be applied in the present disclosure, which is also preferable in terms of improvement of the durability of the image bearing member and the quality of image.

Toner that is used to develop an image on the image bearing member 1 by a development unit 14 illustrated in FIG. 5 is transferred to a transfer paper 17. However, not all of the toner is transferred but some of it remains on the image bearing member 1.

Such remaining toner is removed from the image bearing member 1 by a fur brush 22 or a cleaning blade 23.

Cleaning is performed by a known cleaning brush (e.g., a fur brush, a magfur brush) singly or in combination with a cleaning blade.

As described above, cleaning is a process of removing the toner, etc. remaining on the image bearing member 1 after transfer. Therefore, the fur brush 22 and/or the cleaning blade 23 repetitively abrade the surface of the image bearing member 1, thereby accelerating the abrasion thereof or causing scarring, which may lead to production of abnormal images.

In addition, if the surface of the image bearing member 1 is contaminated because of bad cleaning performance, the working life of the image bearing member 1 is significantly shortened as well as abnormal images are easily produced.

In particular, in the case of an image bearing member having a protection layer as the uppermost layer to improve the abrasion resistance, contaminated materials attached to the surface of the image bearing member is not easily removed but promotes occurrence of filming and production of abnormal images.

Therefore, it is extremely preferable to improve the cleaning property of the image bearing member with regard to improvement of the durability of the image bearing member and the quality of images.

A method of reducing the friction index of the surface of an image bearing member is known to improve the cleaning property of the image bearing member.

Methods of reducing the friction index of the surface of an image bearing member are classified into a method of containing various kinds of lubricants in the surface of an image bearing member and a method of supplying such lubricants to the surface of an image bearing member.

The former is advantageous for an image bearing member having a small diameter because the freedom of layout is wide around the print engine. However, the friction index significantly increases over repetitive use, which is disadvantageous in terms of sustainability.

On the other hand, although the latter is required to have a device to supply the lubricants, the friction index is stable for an extended period of time, which is preferable with regard to improvement of the durability of the image bearing member.

Among these, since a method of containing the lubricant in a development agent containing toner to attach the lubricant to the surface of the image bearing member during development is not limited by the layout around the print engine and good to maintain the friction index for an extended period of time, this method is extremely suitable to improve the durability of the image bearing member and the quality of image.

Specific examples of the lubricants include, but are not limited to, liquid lubricants such as silicone oil and fluorine-containing oil, fluorine-containing resins such as PTFE, PFA, and PVDF, polyolefin resins, silicon grease, fluorine-containing grease, paraffin wax, aliphatic acid esters, aliphatic metal salts such as zinc stearate, black lead, and molybdenum disulfide. Powder lubricants are suitable if such lubricants are mixed with a development agent. In particular, zinc stearate is extremely preferable because it has less adverse impact.

When zinc stearate powder is contained in toner, the weight ratio of zinc stearate to toner is preferably from 0.01 to 0.5 weight % and more preferably from 0.1 to 0.3 weight % considering the balance and impact on toner.

The image bearing member of the present disclosure is applicable to an image bearing member having a small diameter because the image bearing member has a high photosensitivity and stability.

Therefore, an image forming apparatus or a system in which the image bearing member described above is preferably used have multiple image bearing members corresponding to development units arranged for multiple color toners to conduct processing in parallel, which is so-called "a tandem type image forming apparatus" or "a tandem type system".

The image forming apparatus employing the tandem type system includes at least four color toners of yellow (Y), magenta (M), cyan (C), and black (K) required for full color printing, development units that accommodate the toners, and at least respective four image bearing members. Therefore, this image forming apparatus enables full color printing at an extremely high speed in comparison with a typical image forming apparatus for full color printing.

Figure 7:
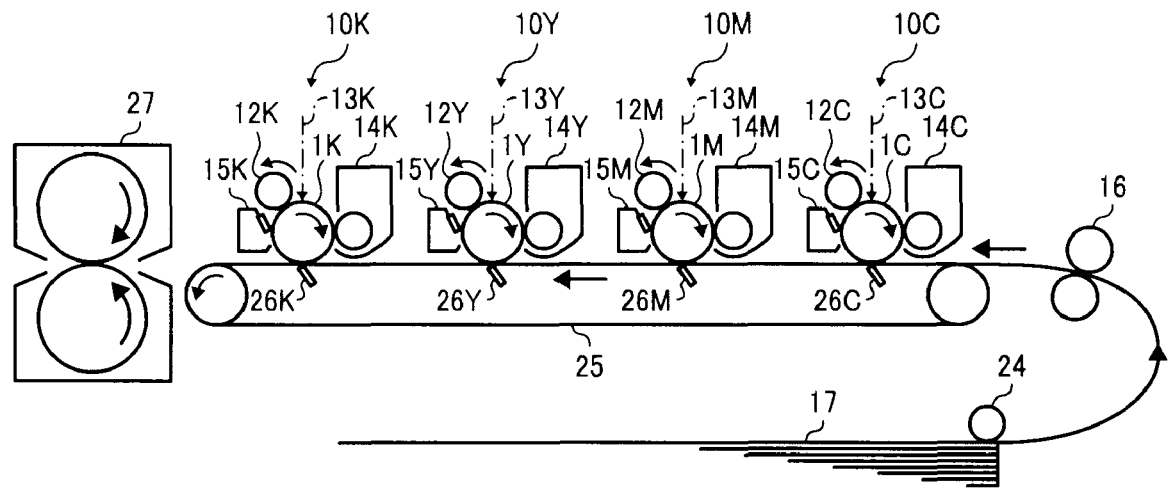
FIG. 7 is a schematic diagram illustrating an example of the full color tandem type image forming apparatus of the present invention.

FIG. 7 is a schematic diagram illustrating an example of the full color image forming apparatus employing the tandem type system and the following variations are within the scope of the present disclosure.

In FIG. 7, the image bearing members 1C, 1M, 1Y, and 1K are the image bearing members having a drum form and rotate in the direction indicated by an arrow. There are arranged at least chargers 12C, 12M, 12Y, and 12K, development devices 14C, 14M, 14Y, and 14K, and cleaners 15C, 15M, 15Y, and 15K in that order around the image bearing members 1C, 1M, 1Y, and 1K relative to the rotation direction of the image bearing members. The chargers 12C, 12M, 12Y, and 12K are charging members constituting charging devices that uniformly charge the surface of the image bearing drum member 1.

An irradiation device (not shown) emits laser beams 13C, 13M, 13Y, and 13K to irradiate the image bearing drum members 1C, 1M, 1Y, and 1K from the gap provided between the charger 12C, 12M, 12Y, and 12K and the development devices 4C, 4M, 4Y, and 4K to form latent electrostatic images on the image bearing drum members 1C, 1M, 1Y, and 1K.

Four image formation units 10C, 10M, 106Y, and 10K including the image bearing members 1C, 1M, 1Y, and 1K are arranged along a transfer belt 25 functioning as a transfer medium conveyor device.

The transfer belt 25 is in contact with the image bearing members 1C, 1M, 1Y, and 1K between the development devices 14C, 14M, 14Y, and 14K and the corresponding cleaners 15C, 15M, 15Y, and 15K of each image formation units 10C, 10M, 10Y, and 10K. Transfer brushes 26C, 26M, 26Y, and 26K that apply a transfer bias are provided on the other side of the transfer belt 25 relative to the side on which the image bearing members 1C, 1M, 1Y, and 1K are in contact with the transfer belt 25.

Each of the image formation units 10C, 10M, 10Y, and 10K has the same structure except that toners contained in the development devices 14C, 14M, 14Y, and 14K have different colors from each other.

The color image forming apparatus having the structure illustrated in FIG. 7 produces images as follows.

In the image formation units 10C, 10M, 10Y, and 10K, the image bearing drum members 1C, 1M, 1Y, and 1K are charged by the chargers 12C, 12M, 12Y, and 12K that are driven to rotate in the direction indicated by an arrow (the same direction as the rotation direction of the image bearing drum members 1C, 1M, 1Y, and 1K) and irradiated with the laser beams 13C, 13M, 13Y, and 13K emitted from the irradiation device (not shown) situated outside the image bearing members 1C, 1M, 1Y, and 1K to produce latent electrostatic images corresponding to an image of each color.

Then, the latent electrostatic images are developed by the development devices 14C, 14M, 14Y, and 14K to form toner images.

The development devices 14C, 14M, 14Y, and 14K develop the latent electrostatic images with C (cyan) toner, M (magenta) toner, Y (yellow) toner, and K (black) toner, respectively. Respective toner images formed on the four image bearing members 1C, 1M, 1Y, and 1K are overlapped on the transfer medium 17. The transfer medium 17 is sent out from a tray by a feeding roller 24, temporarily held at a pair of registration rollers 16, and fed to the transfer belt 10 in synchronization with image formation on the image bearing members 1C, 1M, 1Y, and 1K.

The transfer medium 17 held on the transfer belt 25 is transferred to the contact point (transfer portion) with the image bearing members 1C, 1M, 1Y, and 1K from which each color toner image is transferred. The toner images on the image bearing members 1C, 1M, 1Y, and 1K are transferred to the transfer medium 17 by an electric field formed by a potential difference between the transfer bias applied to the transfer brushes 26C, 26M, 26Y, and 26K and the voltage of the image bearing members 1C, 1M, 1Y, and 1K.

The transfer medium 17 on which four color toner images have been overlapped while the transfer medium 17 passes through the four transfer portions are conveyed to a fixing device 27 where the toner is fixed and then discharged to a discharging portion (not shown).

In addition, toner which has not been transferred to the image bearing members 1C, 1M, 1Y, and 1K and remains thereon are collected by the cleaners 15C, 15M, 15Y, and 15K.

In FIG. 7, the image formation elements are arranged in the sequence of C (cyan), M (magenta), Y (yellow), and K (black) from the upstream to the downstream relative to the transfer direction of the transfer medium, but the sequence is not limited thereto. The sequence of the color is arbitrarily determined.

In addition, when a document of only black color is output, providing a mechanism that suspends the image formation elements 10C, 10M, and 10Y other than for the black color is particularly suitable for the present disclosure.

Moreover, although the chargers 12C, 12M, 12Y, and 12K are in contact with the image bearing members 1C, 1M, 1Y, and 1K in FIG. 7, the abrasion of both and toner filming to the chargers 2C, 2M, 2Y, and 2K can be reduced by providing the charging mechanism as illustrated in FIG. 6 that have a suitable gap of from about 10 to about 200 μm between the chargers 2C, 2M, 2Y, and 2K and the image bearing members 1C, 1M, 1Y, and 1K.

Although the image formation device as described above can be assembled into a photocopier, a facsimile machine, or a printer in a fixed manner, each image formation element may form a process cartridge, which is incorporated into such an apparatus.

The process cartridge for use in an image forming apparatus is a device (or part) that includes a photoelectron conversion element (image bearing member) of the present disclosure with at least one device selected from a charger, a development device, a transfer device, a cleaner, and a discharger and is detachably mounted to the image forming apparatus.

Figure 8:
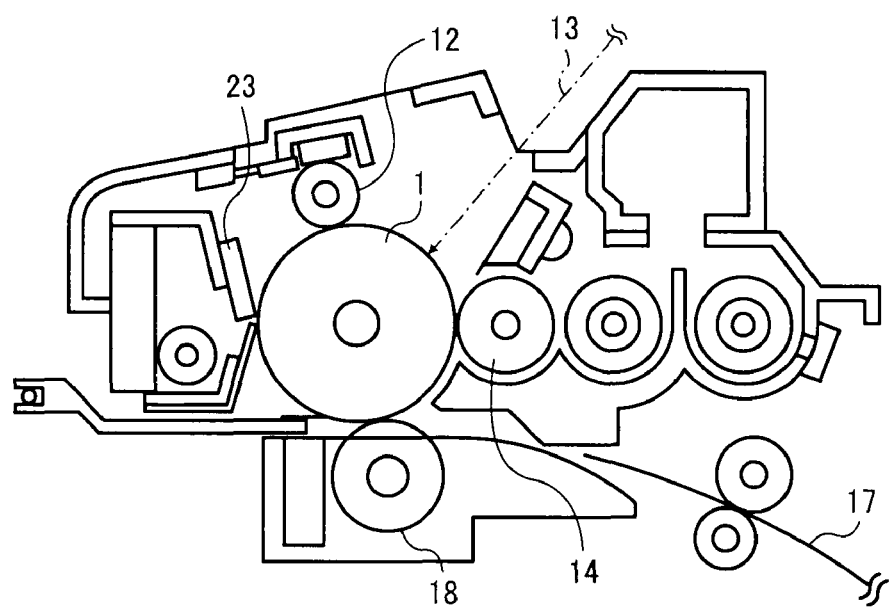
FIG. 8 is a schematic diagram illustrating an example of the process cartridge of the present disclosure.

FIG. 8 is a diagram illustrating an example of the process cartridge. The discharging device is not shown therein.

Since the image forming apparatus employing the tandem system is able to transfer multiple toner images once, a high speed full color printing is achieved.

However, such a system requires at least four image bearing members. Therefore, the size of the apparatus inevitably increases. In addition, depending on the amount of toner, abrasion among the image bearing members is non-uniform, thereby causing problems such as degrading the reproducibility of color or producing abnormal images.

To the contrary, the image bearing member of the present disclosure is suitably used even when it has a small particle diameter because it has a high photosensitivity and stability. In addition, a rise in the residual voltage is reduced and impact caused by deterioration of photosensitivity is limited with regard to the image bearing member of the present disclosure. Therefore, the difference among the image bearing members with regard to the residual voltage and photosensitivity over repetitive use is so small that full color images can be produced with excellent color reproducibility for an extended period of time.

Having generally described (preferred embodiments of) this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Synthesis examples of gallium phthalocyanine compounds of the present disclosure are described below.

Synthesis Example of Chlorogallium Phthalocyanine 30 parts of 1,3-diiminoisoindoline and 8 parts of gallium trichloride are added in 200 ml of dehydraded dimethylsulfoxide. Subsequent to reaction in Ar stream at 150° C. for 12 hours, produced chlorogallium phthalocyanine is filtered.

The thus-obtained wet cake is washed with methylethyl ketone and N,N-dimethylformamide followed by drying to obtain 22 parts (70.3%) of chlorogallium phthalocyanine crystal.

Synthesis Example of Hydroxygallium Phthalocyanine 5 parts of chlorogallium phthalocyanine prepared as described above are dissolved in 150 parts of strong sulfuric acid stored in ice and this sulfuric acid solution is gradually dripped to 500 ml of deionized water stored in ice to precipitate hydroxygallium phthalocyanine crystal.

After filtration of the crystal, the obtained wet cake is washed with 500 ml of 2 weight % ammonium water, the resultant is sufficiently washed with deionized water. Subsequent to drying, 4.6 parts of hydroxygallium phthalocyanine crystal is obtained.

Synthesis Example I-1

Synthesis Example of Gallium Phthalocyanine Compound Represented by Following Chemical Structure

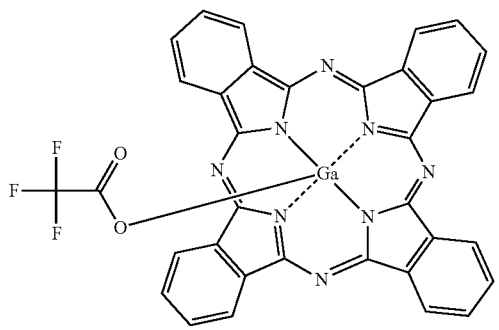

0.62 parts of chlorogallium phthalocyanine and 23 parts of trifluoro acetic acid are added to 100 ml of chlorobenzene and heated to 90° C. for a five-hour reaction.

Subsequent to cooling down, about 10 ml of distilled water is added to the resultant followed by stirring at room temperature for one hour.

The thus-obtained crystal is washed with methylethylketone and deionized water followed by drying to obtain 0.64 parts (93%) of gallium phthalocyanine compound crystal.

Judging from the analysis result of the product obtained as described above by infrared absorption spectrum (KBr tablet method), absorption at a wavelength of 1732 cm$^{-1}$ based on C=O stretching vibration is observed.

Furthermore, m/z: 694.04 (theoretical value: 694.06: $C_{34}H_{16}F_3GaN_8O_2$) is obtained by laser desorption/ionization time-of-flight mass spectrometry (LDI-TOFMS) (negative).

The result of the element analysis of the crystal is shown in Table 1.

Judging from these results, the crystal is confirmed to be gallium phthalocyanine compound represented by the chemical structure illustrated above.

TABLE 1

|  | C | H | N | F |
|---|---|---|---|---|
| Calculated value (%) | 58.74 | 2.32 | 16.12 | 8.20 |
| Actual Value (%) | 58.9 | 2.6 | 16.1 | 7.9 |

Synthesis Example I-2

Synthesis Example of Gallium Phthalocyanine Compound Similar to Synthesis Example I-1

0.64 parts (93%) of a gallium phthalocyanine compound is obtained in the same manner as in Synthesis Example I-1 except that chlorobenzene is changed to dimethyl sulfoxide, the reaction temperature is changed to 110° C., and the reaction time is changed to 7 hours.

Judging from the analysis result of the product obtained as described above by infrared absorption spectrum (KBr tablet method), the thus-obtained spectrum is confirmed to be the same as that obtained in Synthesis Example I-1.

Synthesis Example I-3

Synthesis Example of Gallium Phthalocyanine Compound Similar to Synthesis Example I-1

0.60 parts of hydroxygallium phthalocyanine and 23 parts of trifluoro acetic acid are added to 100 ml of methylethylketone followed by reflux for five hours.

The thus-obtained crystal is washed with methylethylketone and deionized water followed by drying to obtain 0.62 parts (88%) of gallium phthalocyanine compound crystal.

Judging from the analysis result of the product obtained as described above by infrared absorption spectrum (KBr tablet method), the thus-obtained spectrum is confirmed to be the same as that obtained in Synthesis Example I-1.

Synthesis Example I-4

Synthesis Example of Gallium Phthalocyanine Compound Represented by Following Chemical Structure

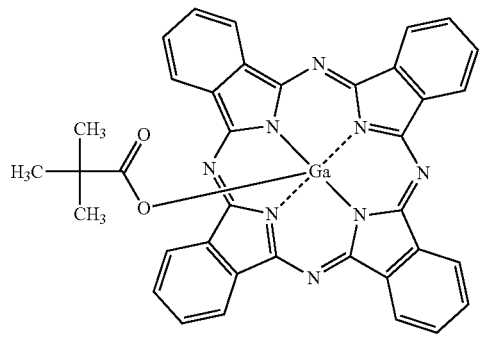

0.60 parts of hydroxygallium phthalocyanine and 2.0 parts of pivalic acid are added to 100 ml of methylethylketone to conduct reaction under reflux for six hours. The thus-obtained crystal is washed with methylethylketone and deionized water followed by drying to obtain 0.60 parts (88%) of gallium phthalocyanine compound crystal. Judging from the analysis result of the product obtained as described above by infrared absorption spectrum (KBr tablet method), absorption at a wavelength of about 3480 cm$^{-1}$ deriving from OH group disappears and absorption at 1655 cm$^{-1}$ based on C=O stretching vibration is observed.

Furthermore, m/z: 682.25 (theoretical value: 682.14: $C_{37}H_{25}GaN_8O_2$) is obtained by laser desorption/ionization time-of-flight mass spectrometry (LDI-TOFMS) (negative).

The result of the element analysis of the crystal is shown in Table 2.

Judging from these results, the crystal is confirmed to be a gallium phthalocyanine compound represented by the chemical structure illustrated above.

TABLE 2

|  | C | H | N |
|---|---|---|---|
| Calculated value (%) | 65.03 | 3.69 | 16.40 |
| Actual Value (%) | 65.2 | 3.5 | 16.5 |

Synthesis Example I-5

Synthesis Example of Gallium Phthalocyanine Compound Represented by Following Chemical Structure

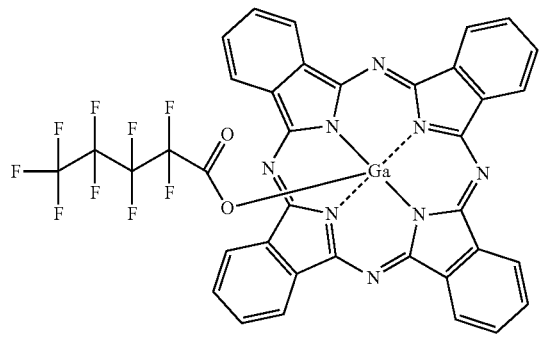

0.60 parts of hydroxygallium phthalocyanine and 5.3 parts of nonafluoro valeic acid are added to 100 ml of methylethylketone to conduct reaction under reflux for six hours.

The thus-obtained crystal is washed with methylethylketone and deionized water followed by drying to obtain 0.72 parts (84%) of gallium phthalocyanine compound crystal.

Judging from the analysis result of the product obtained as described above by infrared absorption spectrum (KBr tablet method), absorption at a wavelength of about 3480 cm$^{-3}$ deriving from OH group disappears and absorption at 1730 cm$^{-1}$ based on C=O stretching vibration is observed.

Furthermore, m/z: 844.02 (theoretical value: 844.05: $C_{37}H_{16}F_9GaN_9O_2$) is obtained by laser desorption/ionization time-of-flight mass spectrometry (LDI-TOFMS) (negative).

The result of the element analysis of the crystal is shown in Table 3.

Judging from these results, the crystal is confirmed to be a gallium phthalocyanine compound represented by the chemical structure illustrated above.

TABLE 3

|  | C | H | N | F |
|---|---|---|---|---|
| Calculated value (%) | 52.57 | 1.91 | 13.26 | 20.23 |
| Actual Value (%) | 52.5 | 1.8 | 13.1 | 19.9 |

Synthesis Example I-6

Synthesis Example of Gallium Phthalocyanine Compound Represented by Following Chemical Structure

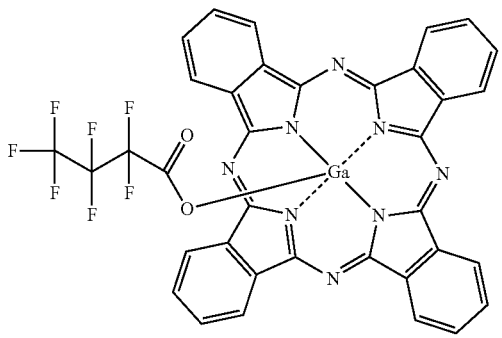

0.60 parts of hydroxygallium phthalocyanine and 4.3 parts of heptafluoro butylic acid are added to 100 ml of methylethylketone to conduct reaction under reflux for six hours.

The thus-obtained crystal is washed with methylethylketone and deionized water followed by drying to obtain 0.66 parts (84%) of gallium phthalocyanine compound crystal.

Judging from the analysis result of the product obtained as described above by infrared absorption spectrum (KBr tablet method), absorption at a wavelength of about 3480 cm$^{-1}$ deriving from OH group disappears and absorption at 1730 cm$^{-1}$ based on C=O stretching vibration is observed.

Furthermore, m/z: 793.96 (theoretical value: 794.05: $C_{36}H_{16}F_7GaN_8O_2$) is obtained by laser desorption/ionization time-of-flight mass spectrometry (LDI-TOFMS) (positive).

The result of the element analysis of the crystal is shown in Table 4.

Judging from these results, the crystal is confirmed to be a gallium phthalocyanine compound represented by the chemical structure illustrated above.

TABLE 4

|  | C | H | N | F |
|---|---|---|---|---|
| Calculated value (%) | 54.37 | 2.03 | 14.09 | 16.72 |
| Actual Value (%) | 54.5 | 2.2 | 14.1 | 17.0 |

Synthesis Example I-7

Synthesis Example of Gallium Phthalocyanine Compound Represented by Following Chemical Structure

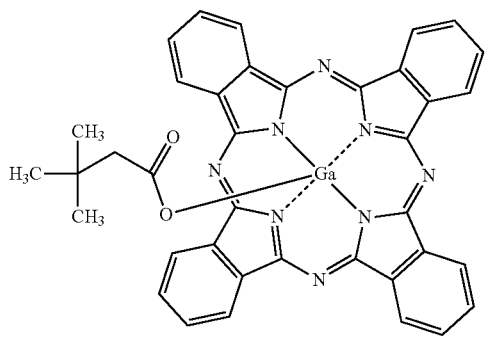

0.60 parts of hydroxygallium phthalocyanine and 2.3 parts of t-butyl acetic acid are added to 100 ml of methylethylketone to conduct reaction under reflux for six hours. The thus-obtained crystal is washed with methylethylketone and deionized water followed by drying to obtain 0.61 parts (88%) of gallium phthalocyanine compound crystal.

Judging from the analysis result of the product obtained as described above by infrared absorption spectrum (KBr tablet method), absorption at a wavelength of about 3480 $cm^{-1}$ deriving from OH group disappears and absorption at 1660 $cm^{-1}$ based on C=O stretching vibration is observed.

Furthermore, m/z: 696.03 (theoretical value: 696.15: $C_{38}H_{27}GaN_8O_2$) is obtained by laser desorption/ionization time-of-flight mass spectrometry (LDI-TOFMS) (negative).

The result of the element analysis of the crystal is shown in Table 5.

Judging from these results, the crystal is confirmed to be a gallium phthalocyanine compound represented by the chemical structure illustrated above.

TABLE 5

|  | C | H | N |
|---|---|---|---|
| Calculated value (%) | 65.45 | 3.90 | 16.07 |
| Actual Value (%) | 65.2 | 3.6 | 16.5 |

Synthesis Example I-8

Synthesis Example of Gallium Phthalocyanine Compound Represented by Following Chemical Structure

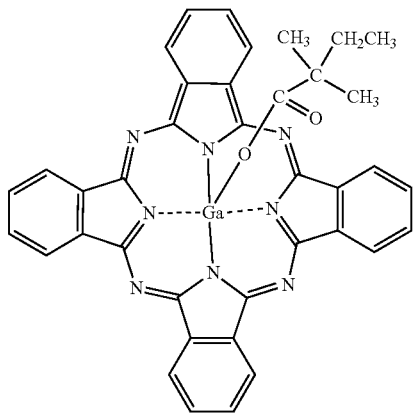

0.60 parts of hydroxygallium phthalocyanine and 2.3 parts of 2,2-dimethyl-n-butylic acid are added to 100 ml of methylethylketone to conduct reaction under reflux for nine hours.

The thus-obtained crystal is washed with methylethylketone and deionized water followed by drying to obtain 0.56 parts (81%) of gallium phthalocyanine compound crystal.

Judging from the analysis result of the product obtained as described above by infrared absorption spectrum (KBr tablet method), absorption at a wavelength of about 3480 $cm^{-1}$ deriving from OH group disappears and absorption at 1662 $cm^{-1}$ based on C=O stretching vibration is observed.

Furthermore, m/z: 696.27 (theoretical value: 696.15: $C_{38}H_{27}GaN_8O_2$) is obtained by laser desorption/ionization time-of-flight mass spectrometry (LDI-TOFMS) (negative).

The result of the element analysis of the crystal is shown in Table 6.

Judging from these results, the crystal is confirmed to be a gallium phthalocyanine compound represented by the chemical structure illustrated above.

TABLE 6

|  | C | H | N |
|---|---|---|---|
| Calculated value (%) | 65.45 | 3.90 | 16.07 |
| Actual Value (%) | 65.1 | 3.8 | 16.0 |

Synthesis Example I-9

Synthesis Example of Gallium Phthalocyanine Compound Represented by Following Chemical Structure

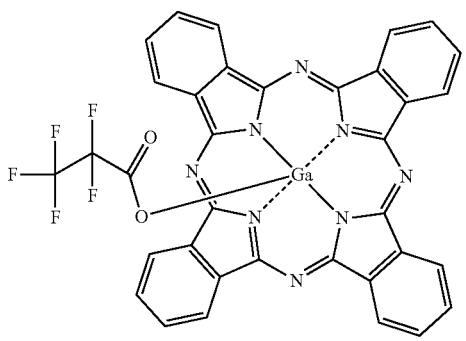

0.62 parts of chlorogallium phthalocyanine and 16 parts of pentafluoro pionic acid are added to 100 ml of xylene and heated to 100° C. for a 15-hour reaction.

Subsequent to cooling down, about 10 ml of distilled water is added to the resultant followed by stirring at room temperature for one hour.

The thus-obtained crystal is washed with methylethylketone and deionized water followed by drying to obtain 0.61 parts (82%) of gallium phthalocyanine compound crystal.

Judging from the analysis result of the product obtained as described above by infrared absorption spectrum (KBr tablet method), absorption at a wavelength of 1724 cm$^{-1}$ based on C=O stretching vibration is observed.

Furthermore, m/z: 744.17 (theoretical value: 744.06: $C_{35}H_{16}F_5GaN_8O_2$) is obtained by laser desorption/ionization time-of-flight mass spectrometry (LDI-TOFMS) (negative).

The result of the element analysis of the crystal is shown in Table 8.

Judging from these results, the crystal is confirmed to be a gallium phthalocyanine compound represented by the chemical structure illustrated above.

TABLE 8

|  | C | H | N | F |
|---|---|---|---|---|
| Calculated value (%) | 56.41 | 2.16 | 15.04 | 12.75 |
| Actual Value (%) | 56.7 | 2.6 | 15.3 | 12.6 |

Synthesis Example I-10

Synthesis Example of Gallium Phthalocyanine Compound Represented by Following Chemical Structure

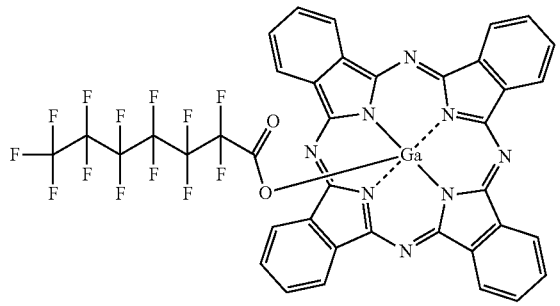

0.60 parts of hydroxygallium phthalocyanine and 1.8 parts of tridecafluoro heptanoic acid are added to 100 ml of methylethylketone to conduct reaction under reflux for nine hours.

The thus-obtained crystal is washed with methylethylketone and deionized water followed by drying to obtain 0.75 parts (79%) of gallium phthalocyanine compound crystal.

Judging from the analysis result of the product obtained as described above by infrared absorption spectrum (KBr tablet method), absorption at a wavelength of about 3480 cm$^{-1}$ deriving from OH group disappears and absorption at 1726 cm$^{-1}$ based on C=O stretching vibration is observed.

Furthermore, m/z: 943.94 (theoretical value: 944.04: $C_{39}H_{16}F_{13}GaN_8O_2$) is obtained by laser desorption/ionization time-of-flight mass spectrometry (LDI-TOFMS) (negative).

The result of the element analysis of the crystal is shown in Table 9.

Judging from these results, the crystal is confirmed to be a gallium phthalocyanine compound represented by the chemical structure illustrated above.

TABLE 9

|  | C | H | N | F |
|---|---|---|---|---|
| Calculated value (%) | 49.55 | 1.71 | 11.85 | 26.13 |
| Actual Value (%) | 50.5 | 2.0 | 12.2 | 25.5 |

Synthesis Example I-11

Synthesis Example of Gallium Phthalocyanine Compound Represented by Following Chemical Structure

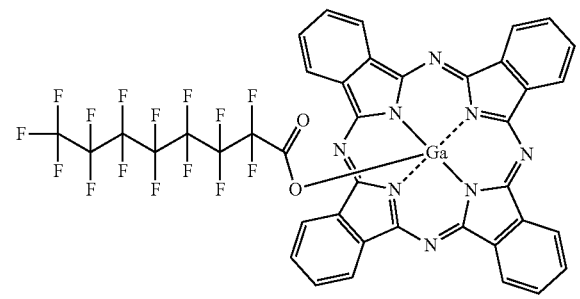

2.47 parts of chlorogallium phthalocyanine and 25.2 parts of a hydrate of pentadecafluoro octanoic acid are added to 150 ml of dimethylsulfoxide and heated to 110° C. for a 25-hour reaction.

During cooling down, 50 ml of distilled water is added to the resultant followed by stirring at room temperature for two hours.

The thus-obtained crystal is washed with methylethylketone and deionized water followed by drying to obtain 2.78 parts (70%) of gallium phthalocyanine compound crystal.

Part of this is re-crystallized with dimethyl sulfoxide followed by the following analysis.

Judging from the analysis result of the product obtained as described above by infrared absorption spectrum (KBr tablet method), absorption at a wavelength of 1732 cm$^{-1}$ based on C=O stretching vibration is observed.

Furthermore, m/z: 993.97 (theoretical value: 994.04: $C_{40}H_{16}F_{15}GaN_8O_2$) is obtained by laser desorption/ionization time-of-flight mass spectrometry (LDI-TOFMS) (positive).

The result of the element analysis of the crystal is shown in Table 11.

Judging from these results, the crystal is confirmed to be a gallium phthalocyanine compound represented by the chemical structure illustrated above.

TABLE 11

|  | C | H | N | F |
|---|---|---|---|---|
| Calculated value (%) | 48.27 | 1.62 | 11.26 | 28.63 |
| Actual Value (%) | 48.3 | 1.4 | 11.5 | 27.4 |

Synthesis Example I-12

Synthesis Example of Gallium Phthalocyanine Compound Represented by Following Chemical Structure

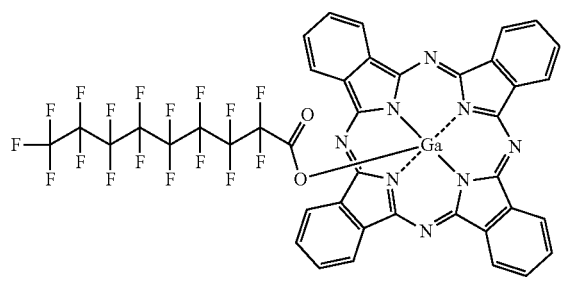

2.47 parts of chlorogallium phthalocyanine and 18.56 parts of heptadecafluoro-n-nonaic acid are added to 150 ml of dimethylsulfoxide and heated to 100° C. for a 22-hour reaction.

During cooling down, 50 ml of distilled water is added to the resultant followed by stirring at room temperature for two hours.

The thus-obtained crystal is washed with methylethylketone and deionized water followed by drying to obtain 3.1 parts (74%) of gallium phthalocyanine compound crystal.

Part of this is re-crystallized with N,N-dimethyl formamide followed by the following analysis.

Judging from the analysis result of the product obtained as described above by infrared absorption spectrum (KBr tablet method), absorption at a wavelength of 1732 cm$^{-1}$ based on C=O stretching vibration is observed.

Furthermore, m/z: 1043.89 (theoretical value: 1044.04: $C_{41}H_{16}F_{17}GaN_8O_2$) is obtained by laser desorption/ionization time-of-flight mass spectrometry (LDI-TOFMS) (negative).

The result of the element analysis of the crystal is shown in Table 12.

Judging from these results, the crystal is confirmed to be a gallium phthalocyanine compound represented by the chemical structure illustrated above.

TABLE 12

|  | C | H | N | F |
|---|---|---|---|---|
| Calculated value (%) | 47.11 | 1.54 | 10.72 | 30.90 |
| Actual Value (%) | 46.5 | 1.3 | 10.9 | 30.6 |

Synthesis Example I-13

Synthesis Example of Gallium Phthalocyanine Compound Represented by Following Chemical Structure

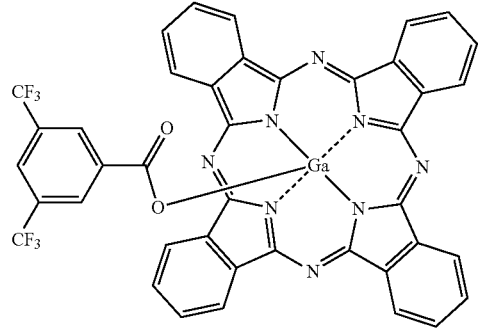

0.60 parts of hydroxygallium phthalocyanine and 1.3 parts of 3,5-bis(trifluoromethyl)benzoic acid are added to 100 ml of methylethylketone to conduct reaction under reflux for eight hours.

The thus-obtained crystal is washed with methylethylketone and deionized water followed by drying to obtain 0.73 parts (87%) of gallium phthalocyanine compound crystal.

Judging from the analysis result of the product obtained as described above by infrared absorption spectrum (KBr tablet method), absorption at a wavelength of about 3480 cm$^{-1}$ deriving from OH group disappears and absorption at 1670 cm$^{-1}$ based on C=O stretching vibration is observed.

Furthermore, m/z: 838.01 (theoretical value: 838.08: $C_{41}H_{19}F_6GaN_8O_2$) is obtained by laser desorption/ionization time-of-flight mass spectrometry (LDI-TOFMS) (negative).

The result of the element analysis of the crystal is shown in Table 13.

Judging from these results, the crystal is confirmed to be a gallium phthalocyanine compound represented by the chemical structure illustrated above.

TABLE 13

|  | C | H | N | F |
|---|---|---|---|---|
| Calculated value (%) | 58.67 | 2.28 | 13.35 | 13.58 |
| Actual Value (%) | 59.0 | 2.7 | 13.1 | 13.5 |

Synthesis Example I-14

Synthesis Example of Gallium Phthalocyanine Compound Represented by Following Chemical Structure

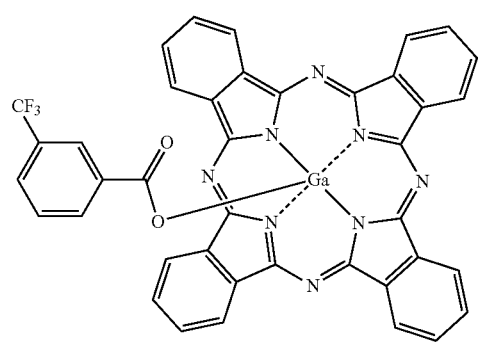

0.60 parts of hydroxygallium phthalocyanine and 1.9 parts of 3-trifluoromethyl benzoic acid are added to 100 ml of ethyl acetic acid to conduct reaction under reflux for eight hours.

The thus-obtained crystal is washed with methylethylketone and deionized water followed by drying to obtain 0.71 parts (92%) of gallium phthalocyanine compound crystal.

Judging from the analysis result of the product obtained as described above by infrared absorption spectrum (KBr tablet method), absorption at a wavelength of about 3480 cm$^{-1}$ deriving from OH group disappears and absorption at 1662 cm$^{-1}$ based on C=O stretching vibration is observed.

Furthermore, m/z: 770.00 (theoretical value: 770.09: $C_{40}H_{20}F_3GaN_8O_2$) is obtained by laser desorption/ionization time-of-flight mass spectrometry (LDI-TOFMS) (negative).

The result of the element analysis of the crystal is shown in Table 13.

Judging from these results, the crystal is confirmed to be a gallium phthalocyanine compound represented by the chemical structure illustrated above.

TABLE 14

|  | C | H | N | F |
|---|---|---|---|---|
| Calculated value (%) | 62.28 | 2.61 | 14.53 | 7.39 |
| Actual Value (%) | 62.1 | 2.6 | 14.1 | 7.6 |

Synthesis Example I-15

Synthesis Example of Gallium Phthalocyanine Compound Represented by Following Chemical Structure

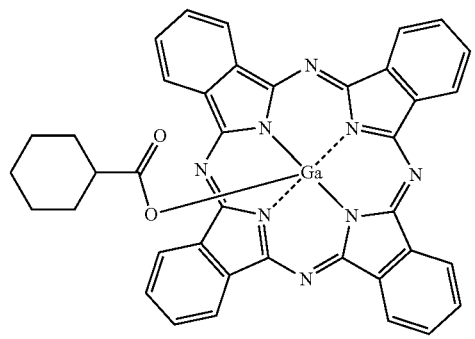

0.60 parts of hydroxygallium phthalocyanine and 0.64 parts of cyclohexane carboxylic acid are added to 100 ml of methylethylketone to conduct reaction under reflux for nine hours.

The thus-obtained crystal is washed with methylethylketone and deionized water followed by drying to obtain 0.61 parts (86%) of gallium phthalocyanine compound crystal.

Judging from the analysis result of the product obtained as described above by infrared absorption spectrum (KBr tablet method), absorption at a wavelength of about 3480 cm$^{-1}$ deriving from OH group disappears and absorption at 1666 cm$^{-1}$ based on C=O stretching vibration is observed.

Furthermore, m/z: 708.18 (theoretical value: 708.15: $C_{39}H_{27}GaN_8O_2$) is obtained by laser desorption/ionization time-of-flight mass spectrometry (LDI-TOFMS) (negative).

The result of the element analysis of the crystal is shown in Table 16.

Judging from these results, the crystal is confirmed to be a gallium phthalocyanine compound represented by the chemical structure illustrated above.

TABLE 15

|  | C | H | N |
|---|---|---|---|
| Calculated value (%) | 66.03 | 3.84 | 15.80 |
| Actual Value (%) | 65.5 | 3.6 | 16.3 |

Synthesis Example I-16

Synthesis Example of Gallium Phthalocyanine Compound Represented by Following Chemical Structure

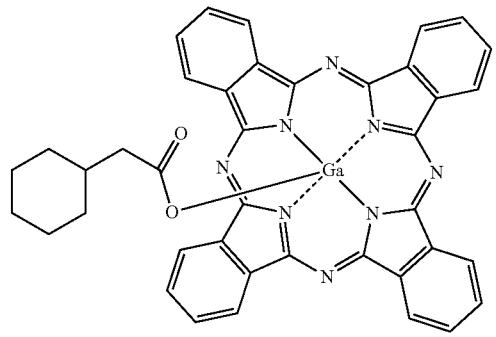

0.60 parts of hydroxygallium phthalocyanine and 0.71 parts of cyclohexyl acetic acid are added to 100 ml of methylethylketone to conduct reaction under reflux for seven hours.

The thus-obtained crystal is washed with methylethylketone and deionized water followed by drying to obtain 0.49 parts (68%) of gallium phthalocyanine compound crystal.

Judging from the analysis result of the product obtained as described above by infrared absorption spectrum (KBr tablet method), absorption at a wavelength of about 3480 cm$^{-1}$ deriving from OH group disappears and absorption at 1666 cm$^{-1}$ based on C=O stretching vibration is observed.

Furthermore, m/z: 722.05 (theoretical value: 722.17: $C_{40}H_{29}GaN_8O_2$) is obtained by laser desorption/ionization time-of-flight mass spectrometry (LDI-TOFMS) (negative).

The result of the element analysis of the crystal is shown in Table 16.

Judging from these results, the crystal is confirmed to be a gallium phthalocyanine compound represented by the chemical structure illustrated above.

TABLE 16

|  | C | H | N |
|---|---|---|---|
| Calculated value (%) | 66.41 | 4.04 | 15.49 |
| Actual Value (%) | 66.0 | 4.6 | 14.9 |

Synthesis Example I-17

Synthesis Example of Gallium Phthalocyanine Compound Represented by Following Chemical Structure

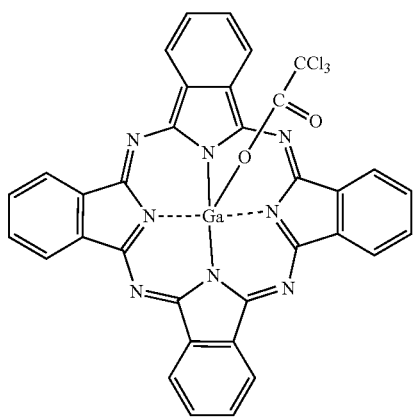

0.60 parts of hydroxygallium phthalocyanine and 1.6 parts of trichloroacetic acid are added to 100 ml of methylethylketone to conduct reaction under reflux for seven hours.

The thus-obtained crystal is washed with methylethylketone and deionized water followed by drying to obtain 0.68 parts (91%) of gallium phthalocyanine compound crystal.

Judging from the analysis result of the product obtained as described above by infrared absorption spectrum (KBr tablet method), absorption at a wavelength of about 3480 cm$^{-1}$ deriving from OH group disappears and absorption at 1714 cm$^{-1}$ based on C=O stretching vibration is observed.

Furthermore, m/z: 741.86 (theoretical value: 741.97: $C_{34}H_{16}C_{13}GaN_8O_2$) is obtained by laser desorption/ionization time-of-flight mass spectrometry (LDI-TOFMS) (positive).

The result of the element analysis of the crystal is shown in Table 17.

Judging from these results, the crystal is confirmed to be a gallium phthalocyanine compound represented by the chemical structure illustrated above.

TABLE 17

|  | C | H | N |
|---|---|---|---|
| Calculated value (%) | 54.84 | 2.17 | 15.05 |
| Actual Value (%) | 54.5 | 1.9 | 15.4 |

Synthesis Example I-18

Synthesis Example of Gallium Phthalocyanine Compound Represented by Following Chemical Structure

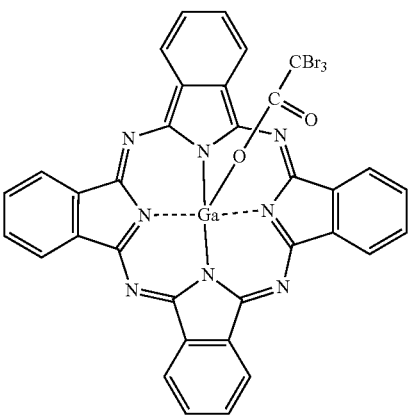

0.60 parts of hydroxygallium phthalocyanine and 2.9 parts of tribromo acetic acid are added to 100 ml of methylethylketone to conduct reaction under reflux for seven hours.

The thus-obtained crystal is washed with methylethylketone and deionized water followed by drying to obtain 0.64 parts (73%) of gallium phthalocyanine compound crystal.

Judging from the analysis result of the product obtained as described above by infrared absorption spectrum (KBr tablet method), absorption at a wavelength of about 3480 cm$^{-1}$ deriving from OH group disappears and absorption at 1680 cm$^{-1}$ based on C=O stretching vibration is observed.

The result of the element analysis of the crystal is shown in Table 18.

Judging from these results, the crystal is confirmed to be a gallium phthalocyanine compound represented by the chemical structure illustrated above.

TABLE 18

|  | C | H | N |
|---|---|---|---|
| Calculated value (%) | 46.51 | 1.84 | 12.76 |
| Actual Value (%) | 46.3 | 1.6 | 12.3 |

Synthesis Example I-19

Synthesis Example of Gallium Phthalocyanine Compound Represented by Following Chemical Structure

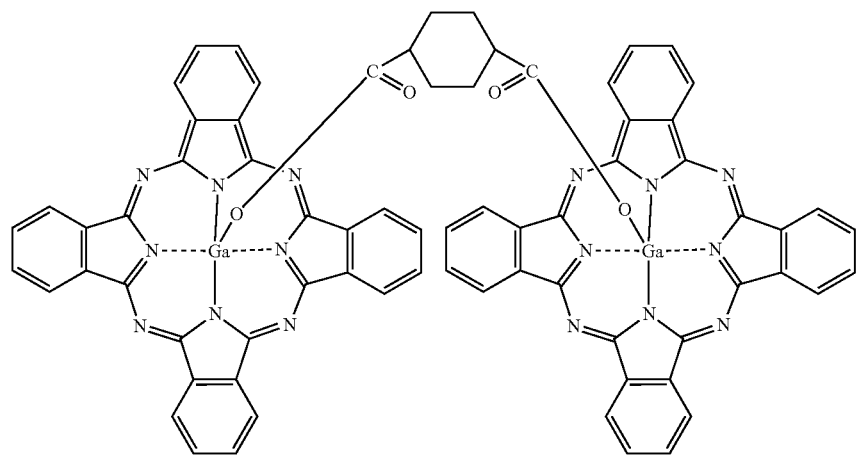

0.60 parts of hydroxygallium phthalocyanine and 0.086 parts of 1,4-cyclohexane dicarboxylic acid are added to 100 ml of dimethylsulfoxide to conduct reaction at 100° C. for six hours.

The thus-obtained crystal is washed with methylethylketone and deionized water followed by drying to obtain 0.60 parts (90%) of gallium phthalocyanine compound crystal.

Judging from the analysis result of the product obtained as described above by infrared absorption spectrum (KBr tablet method), absorption at a wavelength of about 3480 $cm^{-1}$ deriving from OH group disappears and absorption at 1655 $cm^{-1}$ based on C=O stretching vibration is observed.

Furthermore, m/z: 1332.01 (theoretical value: 1332.21: $C_{72}H_{42}Ga_2N_{16}O_4$) is obtained by laser desorption/ionization time-of-flight mass spectrometry (LDI-TOFMS) (negative).

The result of the element analysis of the crystal is shown in Table 18.

Judging from these results, the crystal is confirmed to be a gallium phthalocyanine compound represented by the chemical structure illustrated above.

TABLE 19

|  | C | H | N |
|---|---|---|---|
| Calculated value (%) | 64.79 | 3.17 | 16.79 |
| Actual Value (%) | 64.3 | 2.9 | 16.4 |

Synthesis Example I-20

Synthesis Example of Gallium Phthalocyanine Compound Represented by Following Chemical Structure

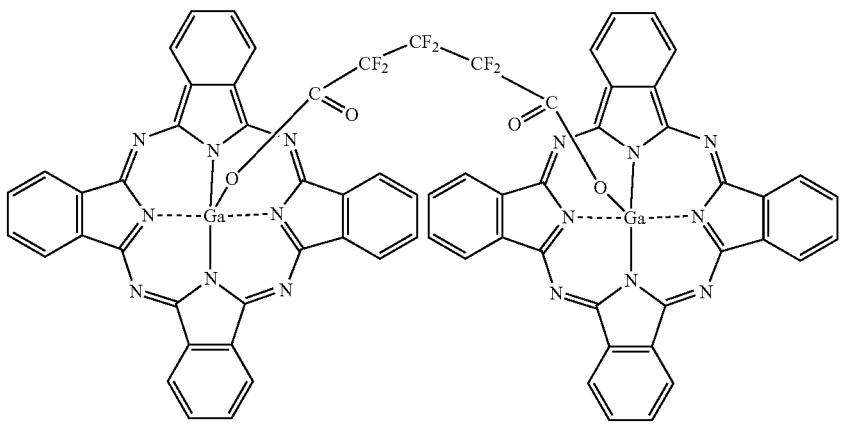

0.60 parts of hydroxygallium phthalocyanine and 0.12 parts of hepxafluoro glutaric acid are added to 100 ml of methylethylketone to conduct reaction under reflux for 9.5 hours.

The thus-obtained crystal is washed with methylethylketone and deionized water followed by drying to obtain 0.31 parts (44%) of gallium phthalocyanine compound crystal.

Judging from the analysis result of the product obtained as described above by infrared absorption spectrum (KBr tablet method), absorption at a wavelength of about 3480 cm$^{-1}$ deriving from OH group disappears and absorption at 1720 cm$^{-1}$ based on C=O stretching vibration is observed.

Furthermore, m/z: 1399.97 (theoretical value: 1400.12: $C_{69}H_{32}F_6Ga_2N_{16}O_4$) is obtained by laser desorption/ionization time-of-flight mass spectrometry (LDI-TOFMS) (negative).

The result of the element analysis of the crystal is shown in Table 20.

Judging from these results, the crystal is confirmed to be a gallium phthalocyanine compound represented by the chemical structure illustrated above.

TABLE 20

|  | C | H | N |
|---|---|---|---|
| Calculated value (%) | 59.09 | 2.30 | 15.98 |
| Actual Value (%) | 59.2 | 2.0 | 15.6 |

Synthesis Example I-21

Synthesis Example of Gallium Phthalocyanine Compound Represented by Following Chemical Structure

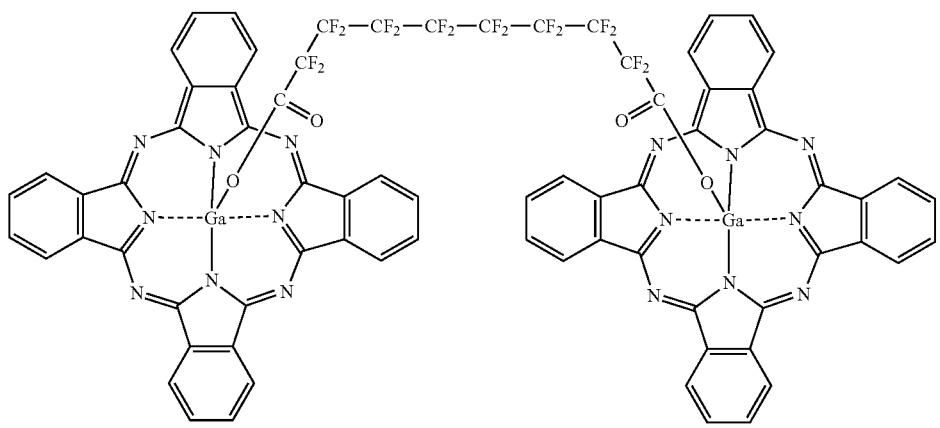

0.60 parts of hydroxygallium phthalocyanine and 0.25 parts of hexadecafluoro sebacic acid are added to 100 ml of dimethylsulfoxide to conduct reaction at 100° C. for 13 hours. During cooling down, 50 ml of distilled water is added to the resultant followed by stirring at room temperature for two hours.

The thus-obtained crystal is washed with methylethylketone and deionized water followed by drying to obtain 0.52 parts (63%) of gallium phthalocyanine compound crystal.

Judging from the analysis result of the product obtained as described above by infrared absorption spectrum (KBr tablet method), absorption at a wavelength of about 3480 cm$^{-1}$ deriving from OH group disappears and absorption at 1720 cm$^{-1}$ based on C=O stretching vibration is observed.

The result of the element analysis of the crystal is shown in Table 21.

Judging from these results, the crystal is confirmed to be a gallium phthalocyanine compound represented by the chemical structure illustrated above.

TABLE 21

|  | C | H | N |
|---|---|---|---|
| Calculated value (%) | 53.78 | 1.95 | 13.56 |
| Actual Value (%) | 53.4 | 1.6 | 13.4 |

Synthesis Example I-22

Synthesis Example of Gallium Phthalocyanine Compound Represented by Following Chemical Structure

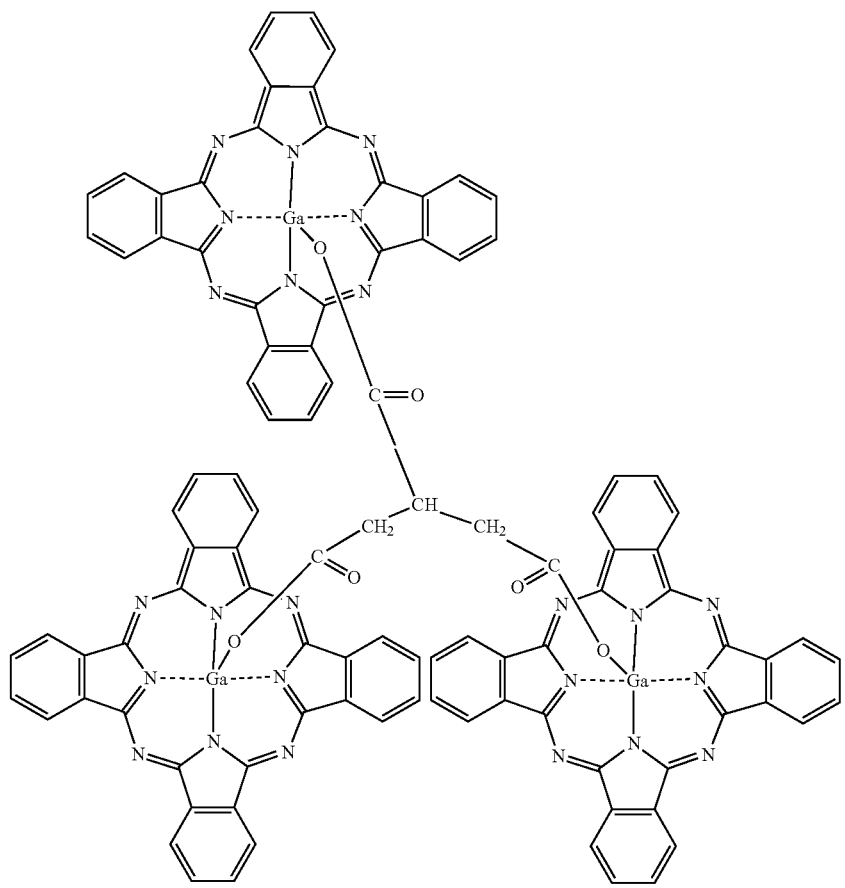

0.90 parts of hydroxygallium phthalocyanine and 0.088 parts of 1,2,3-propane tricarboxylic acid are added to 100 ml of methylethylketone to conduct reaction under reflux for nine hours.

The thus-obtained crystal is washed with methylethylketone and deionized water followed by drying to obtain 0.89 parts (93%) of gallium phthalocyanine compound crystal.

Judging from the analysis result of the product obtained as described above by infrared absorption spectrum (KBr tablet method), absorption at a wavelength of about 3480 $cm^{-1}$ deriving from OH group disappears and absorption at 1662 $cm^{-1}$ based on C=O stretching vibration is observed.

The result of the element analysis of the crystal is shown in Table 22.

Judging from these results, the crystal is confirmed to be a gallium phthalocyanine compound represented by the chemical structure illustrated above.

TABLE 22

|  | C | H | N |
| --- | --- | --- | --- |
| Calculated value (%) | 63.81 | 2.78 | 17.51 |
| Actual Value (%) | 63.4 | 2.4 | 17.5 |

Synthesis Example I-23

Synthesis Example of Gallium Phthalocyanine Compound Represented by Following Chemical Structure

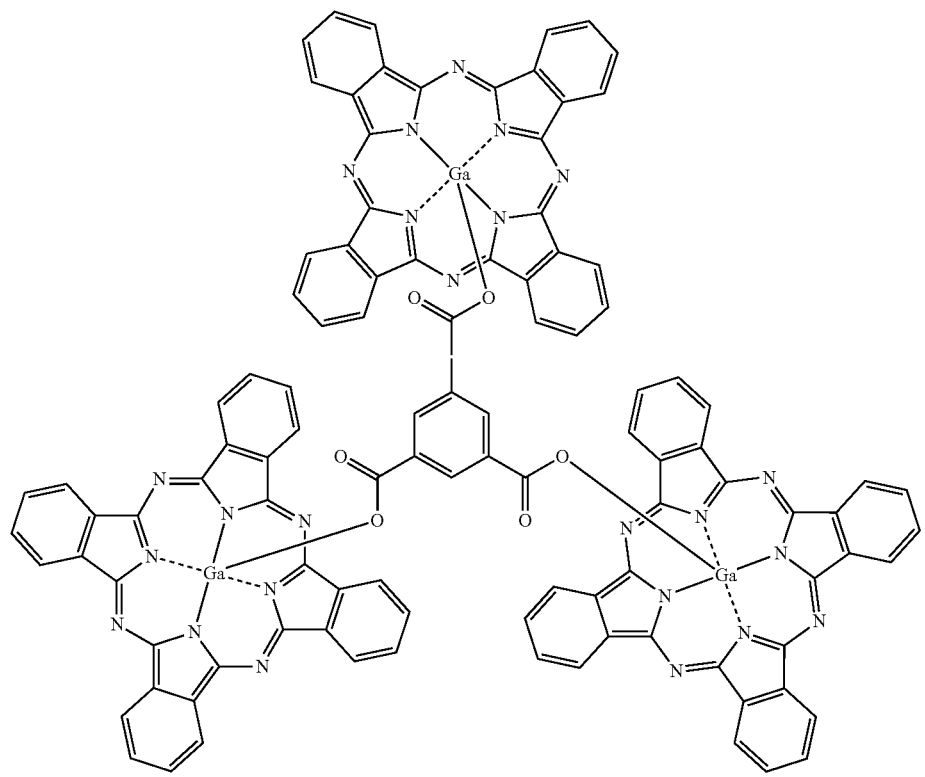

0.90 parts of hydroxygallium phthalocyanine and 0.105 parts of trimesic acid are added to 100 ml of dimethylsulfoxide to conduct reaction at 100° C. for seven hours.

The thus-obtained crystal is washed with methylethylketone and deionized water followed by drying to obtain 0.92 parts (94%) of gallium phthalocyanine compound crystal.

Judging from the analysis result of the product obtained as described above by infrared absorption spectrum (KBr tablet method), absorption at a wavelength of about 3480 $cm^{-1}$ deriving from OH group disappears and absorption at 1668 $cm^{-1}$ based on C=O stretching vibration is observed. The result of the element analysis of the crystal is shown in Table 23.

Judging from these results, the crystal is confirmed to be a gallium phthalocyanine compound represented by the chemical structure illustrated above.

TABLE 23

|  | C | H | N |
|---|---|---|---|
| Calculated value (%) | 64.55 | 2.63 | 17.20 |
| Actual Value (%) | 64.3 | 2.5 | 17.1 |

Synthesis Example I-24

Synthesis Example of Gallium Phthalocyanine Compound Represented by Following Chemical Structure

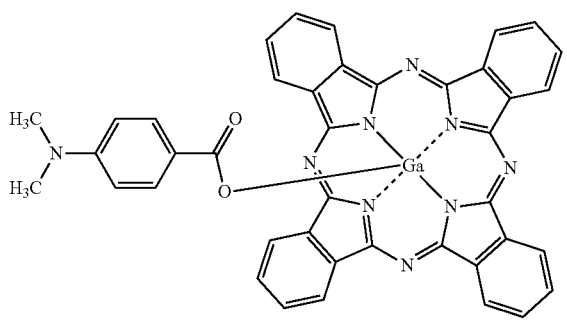

1.20 parts of hydroxygallium phthalocyanine and 16.52 parts of 4-dimethylamino benzoic acid are added to 100 ml of dimethylsulfoxide to conduct reaction at 100° C. for seven hours.

The thus-obtained crystal is washed with a liquid mixture of 80 ml of methylethylketone and 80 ml of N,N-dimethylformamide, then methylethylketone, and deionized water followed by drying to obtain 1.47 parts (98%) of gallium phthalocyanine compound crystal.

Judging from the analysis result of the product obtained as described above by infrared absorption spectrum (KBr tablet method), absorption at a wavelength of about 3480 cm$^{-1}$ deriving from OH group disappears and absorption at 1645 cm$^{-1}$ based on C=O stretching vibration is observed. Furthermore, m/z: 745.04 (theoretical value: 745.15: $C_{41}H_{26}GaN_9O_2$) is obtained by laser desorption/ionization time-of-flight mass spectrometry (LDI-TOFMS) (positive).

The result of the element analysis of the crystal is shown in Table 24.

Judging from these results, the crystal is confirmed to be a gallium phthalocyanine compound represented by the chemical structure illustrated above.

TABLE 24

|  | C | H | N |
|---|---|---|---|
| Calculated value (%) | 65.97 | 3.51 | 16.89 |
| Actual Value (%) | 65.7 | 3.4 | 16.8 |

Synthesis Example I-25

Synthesis Example of Gallium Phthalocyanine Compound Represented by Following Chemical Structure

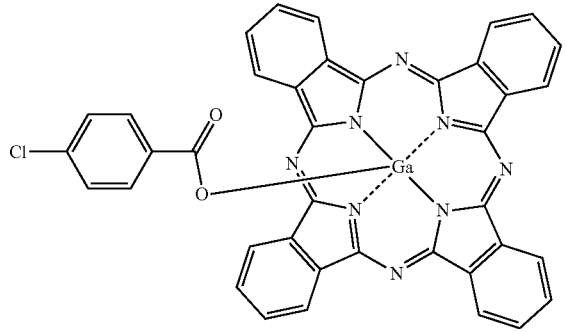

1.20 parts of hydroxygallium phthalocyanine and 15.66 parts of 4-chloro benzoic acid are added to a liquid mixture of 100 ml of dimethylsulfoxide and 50 ml of N,N-dimethylformamide to conduct reaction at 100° C. for seven hours.

The thus-obtained crystal is washed with a liquid mixture of 50 ml of methylethylketone and 50 ml of N,N-dimethylformamide, then methylethylketone, and deionized water.

Subsequent to drying, 1.41 parts (95%) of gallium phthalocyanine compound crystal is obtained.

Judging from the analysis result of the product obtained as described above by infrared absorption spectrum (KBr tablet method), absorption at a wavelength of about 3480 cm$^{-1}$ deriving from OH group disappears and absorption at 1654 cm$^{-1}$ based on C=O stretching vibration is observed.

Furthermore, m/z: 735.97 (theoretical value: 736.07: $C_{39}H_{20}GaClN_8O_2$) is obtained by laser desorption/ionization time-of-flight mass spectrometry (LDI-TOFMS) (negative).

The result of the element analysis of the crystal is shown in Table 25.

Judging from these results, the crystal is confirmed to be a gallium phthalocyanine compound represented by the chemical structure illustrated above.

TABLE 25

|  | C | H | N |
|---|---|---|---|
| Calculated value (%) | 63.49 | 2.73 | 15.19 |
| Actual Value (%) | 63.3 | 2.6 | 15.0 |

Synthesis Example I-26

Synthesis Example of Gallium Phthalocyanine Compound Represented by Following Chemical Structure

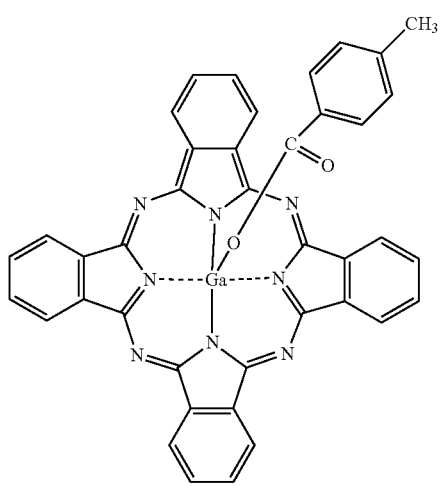

1.20 parts of hydroxygallium phthalocyanine and 13.62 parts of 4-methyl benzoic acid are added to a liquid mixture of 100 ml of methylethyl ketone and 50 ml of N,N-dimethylformamide to conduct reaction at 100° C. for six hours.

The thus-obtained crystal is washed with a liquid mixture of 50 ml of methylethylketone and 50 ml of N,N-dimethylformamide, then methylethylketone, and deionized water.

Subsequent to drying, 1.38 parts (96%) of gallium phthalocyanine compound crystal is obtained.

Judging from the analysis result of the product obtained as described above by infrared absorption spectrum (KBr tablet method), absorption at a wavelength of about 3480 cm$^{-1}$ deriving from OH group disappears and absorption at 1655 cm$^{-1}$ based on C=O stretching vibration is observed.

Furthermore, m/z: 716.01 (theoretical value: 716.12: $C_{40}H_{23}GaN_8O_2$) is obtained by laser desorption/ionization time-of-flight mass spectrometry (LDI-TOFMS) (negative).

The result of the element analysis of the crystal is shown in Table 26.

Judging from these results, the crystal is confirmed to be a gallium phthalocyanine compound represented by the chemical structure illustrated above.

TABLE 26

|  | C | H | N |
|---|---|---|---|
| Calculated value (%) | 66.97 | 3.23 | 15.62 |
| Actual Value (%) | 67.1 | 3.1 | 15.5 |

Synthesis Example I-27

Synthesis Example of Gallium Phthalocyanine Compound Represented by Following Chemical Structure

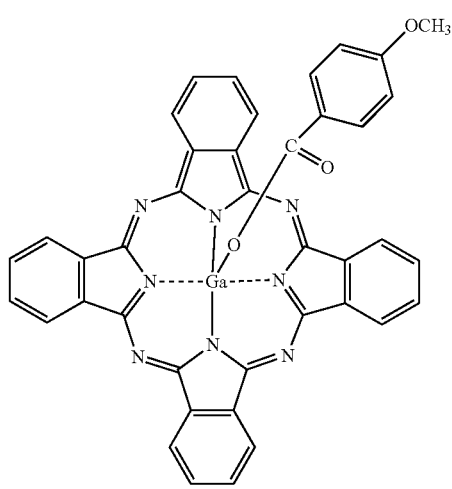

1.20 parts of hydroxygallium phthalocyanine and 15.22 parts of 4-methoxy benzoic acid are added to a liquid mixture of 100 ml of methylethyl ketone and 50 ml of N,N-dimethylformamide to conduct reaction at 100° C. for six hours.

The thus-obtained crystal is washed with a liquid mixture of 50 ml of methylethylketone and 50 ml of N,N-dimethylformamide, then methylethylketone, and deionized water.

Subsequent to drying, 1.37 parts (93%) of gallium phthalocyanine compound crystal is obtained.

Judging from the analysis result of the product obtained as described above by infrared absorption spectrum (KBr tablet method), absorption at a wavelength of about 3480 cm$^{-1}$ deriving from OH group disappears and absorption at 1655 cm$^{-1}$ based on C=O stretching vibration is observed.

Furthermore, m/z: 732.00 (theoretical value: 732.11: $C_{40}H_{23}GaN_8O_3$) is obtained by laser desorption/ionization time-of-flight mass spectrometry (LDI-TOFMS) (positive).

The result of the element analysis of the crystal is shown in Table 27.

Judging from these results, the crystal is confirmed to be a gallium phthalocyanine compound represented by the chemical structure illustrated above.

TABLE 27

|  | C | H | N |
|---|---|---|---|
| Calculated value (%) | 65.51 | 3.16 | 15.28 |

TABLE 27-continued

|  | C | H | N |
|---|---|---|---|
| Actual Value (%) | 65.1 | 2.8 | 15.2 |

Synthesis Example I-28

Synthesis Example of Gallium Phthalocyanine Compound Represented by Following Chemical Structure

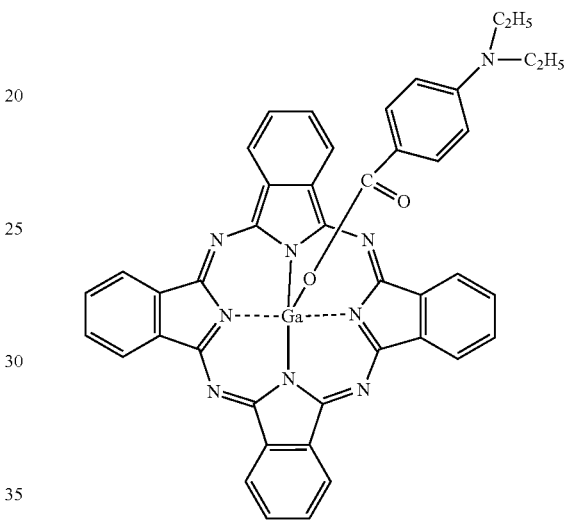

1.20 parts of hydroxygallium phthalocyanine and 7.73 parts of 4-diethylamino benzoic acid are added to 100 ml of N,N-dimethylformamide to conduct reaction at 100° C. for 6.5 hours.

The thus-obtained crystal is washed with 100 ml of N,N-dimethylformamide, then methylethylketone, and deionized water.

Subsequent to drying, 1.48 parts (95%) of gallium phthalocyanine compound crystal is obtained.

Judging from the analysis result of the product obtained as described above by infrared absorption spectrum (KBr tablet method), absorption at a wavelength of about 3480 cm$^{-1}$ deriving from OH group disappears and absorption at 1645 cm$^{-1}$ based on C=O stretching vibration is observed.

The result of the element analysis of the crystal is shown in Table 28.

Judging from these results, the crystal is confirmed to be a gallium phthalocyanine compound represented by the chemical structure illustrated above.

TABLE 28

|  | C | H | N |
|---|---|---|---|
| Calculated value (%) | 66.69 | 3.90 | 16.28 |
| Actual Value (%) | 66.8 | 3.8 | 16.0 |

Synthesis Example I-29

Synthesis Example of Gallium Phthalocyanine Compound Represented by Following Chemical Structure

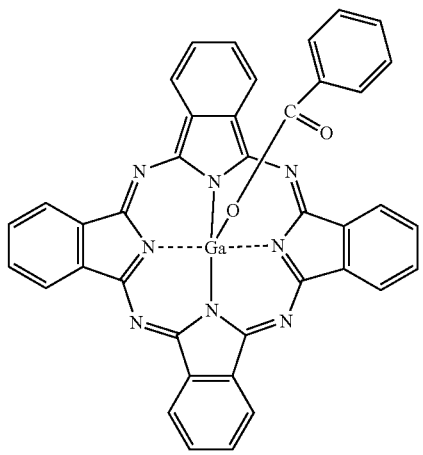

1.20 parts of hydroxygallium phthalocyanine and 4.88 parts of benzoic acid are added to 100 ml of N,N-dimethylformamide to conduct reaction at 100° C. for 7 hours.

The thus-obtained crystal is washed with 100 ml of N,N-dimethylformamide, then methylethylketone, and deionized water.

Subsequent to drying, 1.26 parts (90%) of gallium phthalocyanine compound crystal is obtained.

Judging from the analysis result of the product obtained as described above by infrared absorption spectrum (KBr tablet method), absorption at a wavelength of about 3480 cm$^{-1}$ deriving from OH group disappears and absorption at 1653 cm$^{-1}$ based on C=O stretching vibration is observed.

The result of the element analysis of the crystal is shown in Table 29.

Judging from these results, the crystal is confirmed to be a gallium phthalocyanine compound represented by the chemical structure illustrated above.

TABLE 29

|  | C | H | N |
|---|---|---|---|
| Calculated value (%) | 66.60 | 3.01 | 15.93 |
| Actual Value (%) | 66.5 | 2.9 | 16.0 |

Synthesis Example I-30

Synthesis Example of Gallium Phthalocyanine Compound Represented by Following Chemical Structure

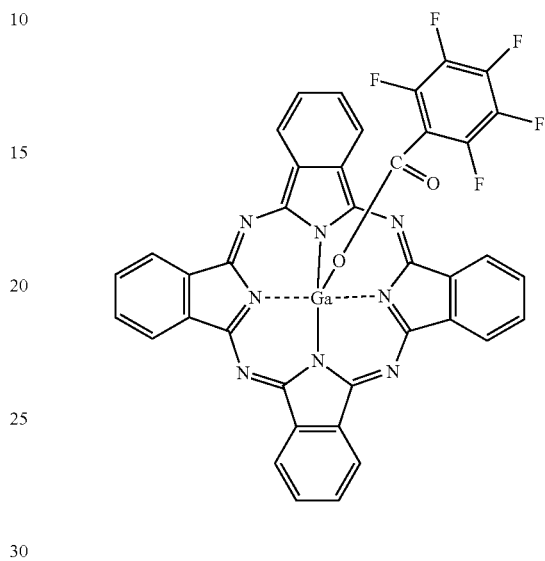

1.20 parts of hydroxygallium phthalocyanine and 8.48 parts of pentafluoro benzoic acid are added to 100 ml of N,N-dimethylformamide to conduct reaction at 100° C. for seven hours.

The thus-obtained crystal is washed with 100 ml of N,N-dimethylformamide, then methylethylketone, and deionized water.

Subsequent to drying, 1.15 parts (72%) of gallium phthalocyanine compound crystal is obtained.

Judging from the analysis result of the product obtained as described above by infrared absorption spectrum (KBr tablet method), absorption at a wavelength of about 3480 cm$^{-1}$ deriving from OH group disappears and absorption at 1678 cm$^{-1}$ based on C=O stretching vibration is observed.

The result of the element analysis of the crystal is shown in Table 30.

Judging from these results, the crystal is confirmed to be a gallium phthalocyanine compound represented by the chemical structure illustrated above.

TABLE 30

|  | C | H | N |
|---|---|---|---|
| Calculated value (%) | 59.05 | 2.03 | 14.12 |
| Actual Value (%) | 59.0 | 2.1 | 13.9 |

Synthesis Example I-31

Synthesis Example of Gallium Phthalocyanine Compound Represented by Following Chemical Structure

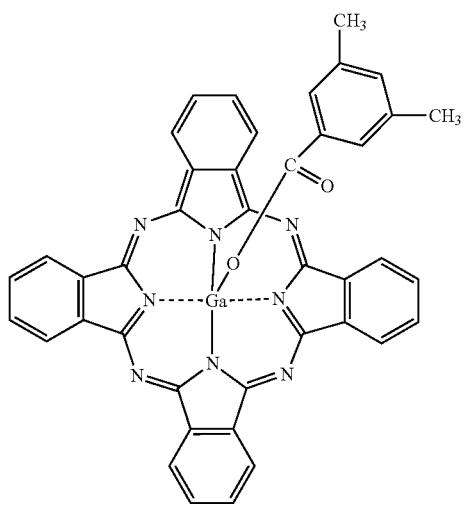

1.20 parts of hydroxygallium phthalocyanine and 6.01 parts of 3,5-dimethyl benzoic acid are added to 100 ml of N,N-dimethylformamide to conduct reaction at 100° C. for 7 hours.

The thus-obtained crystal is washed with 100 ml of N,N-dimethylformamide, then methylethylketone, and deionized water.

Subsequent to drying, 1.34 parts (92%) of gallium phthalocyanine compound crystal is obtained.

Judging from the analysis result of the product obtained as described above by infrared absorption spectrum (KBr tablet method), absorption at a wavelength of about 3480 cm$^{-1}$ deriving from OH group disappears and absorption at 1658 cm$^{-1}$ based on C=O stretching vibration is observed. The result of the element analysis of the crystal is shown in Table 31.

Judging from these results, the crystal is confirmed to be a gallium phthalocyanine compound represented by the chemical structure illustrated above.

TABLE 31

|  | C | H | N |
|---|---|---|---|
| Calculated value (%) | 67.33 | 3.45 | 15.32 |
| Actual Value (%) | 67.0 | 3.3 | 15.1 |

Synthesis Example I-32

Synthesis Example of Gallium Phthalocyanine Compound Represented by Following Chemical Structure

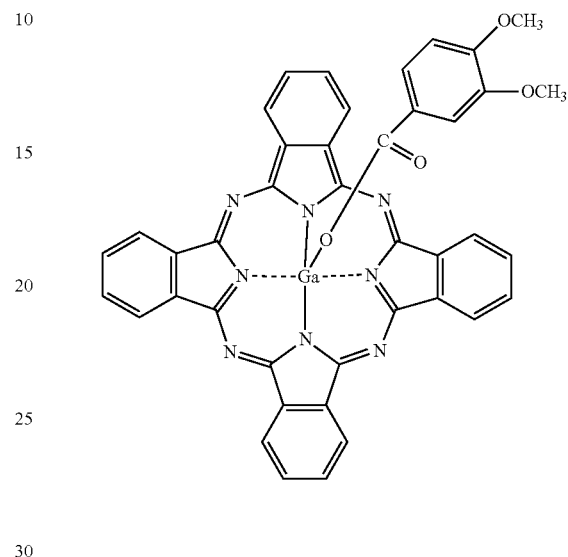

1.20 parts of hydroxygallium phthalocyanine and 7.29 parts of 3,4-dimethoxy benzoic acid are added to 100 ml of N,N-dimethylformamide to conduct reaction at 100° C. for seven hours.

The thus-obtained crystal is washed with 100 ml of N,N-dimethylformamide, then methylethylketone, and deionized water.

Subsequent to drying, 1.30 parts (85%) of gallium phthalocyanine compound crystal is obtained.

Judging from the analysis result of the product obtained as described above by infrared absorption spectrum (KBr tablet method), absorption at a wavelength of about 3480 cm$^{-1}$ deriving from OH group disappears and absorption at 1653 cm$^{-1}$ based on C=O stretching vibration is observed.

The result of the element analysis of the crystal is shown in Table 32.

Judging from these results, the crystal is confirmed to be a gallium phthalocyanine compound represented by the chemical structure illustrated above.

TABLE 32

|  | C | H | N |
|---|---|---|---|
| Calculated value (%) | 64.51 | 3.30 | 14.68 |
| Actual Value (%) | 64.4 | 3.1 | 14.6 |

Synthesis Example I-33

Synthesis Example of Gallium Phthalocyanine Compound Represented by Following Chemical Structure

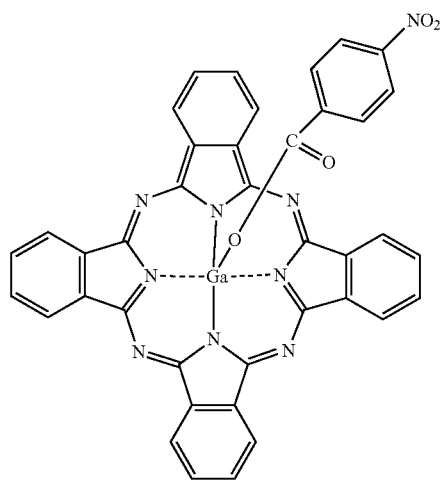

1.20 parts of hydroxygallium phthalocyanine and 6.68 parts of 4-nitro benzoic acid are added to 100 ml of N,N-dimethylformamide to conduct reaction at 100° C. for seven hours.

The thus-obtained crystal is washed with 100 ml of N,N-dimethylformamide, then methylethylketone, and deionized water.

Subsequent to drying, 1.20 parts (80%) of gallium phthalocyanine compound crystal is obtained.

Judging from the analysis result of the product obtained as described above by infrared absorption spectrum (KBr tablet method), absorption at a wavelength of about 3480 cm$^{-1}$ deriving from OH group disappears and absorption at 1660 cm$^{-1}$ based on C=O stretching vibration is observed.

The result of the element analysis of the crystal is shown in Table 33.

Judging from these results, the crystal is confirmed to be a gallium phthalocyanine compound represented by the chemical structure illustrated above.

TABLE 33

|  | C | H | N |
| --- | --- | --- | --- |
| Calculated value (%) | 62.59 | 3.69 | 16.40 |
| Actual Value (%) | 65.2 | 3.5 | 16.5 |

Synthesis Example I-34

Synthesis Example of Gallium Phthalocyanine Compound Represented by Following Chemical Structure

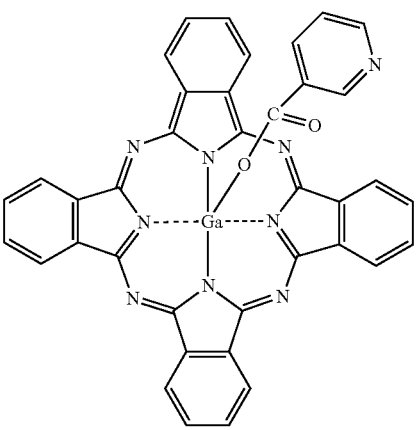

1.20 parts of hydroxygallium phthalocyanine and 4.92 parts of nicotinic acid are added to 100 ml of N,N-dimethylformamide to conduct reaction at 100° C. for 7 hours.

The thus-obtained crystal is washed with 100 ml of N,N-dimethylformamide, then methylethylketone, and deionized water.

Subsequent to drying, 1.25 parts (88%) of gallium phthalocyanine compound crystal is obtained.

Judging from the analysis result of the product obtained as described above by infrared absorption spectrum (KBr tablet method), absorption at a wavelength of about 3480 cm$^{-1}$ deriving from OH group disappears and absorption at 1660 cm$^{-1}$ based on C=O stretching vibration is observed.

The result of the element analysis of the crystal is shown in Table 34.

Judging from these results, the crystal is confirmed to be a gallium phthalocyanine compound represented by the chemical structure illustrated above.

TABLE 34

|  | C | H | N |
| --- | --- | --- | --- |
| Calculated value (%) | 64.80 | 2.86 | 17.90 |
| Actual Value (%) | 64.5 | 2.4 | 17.7 |

Synthesis Example I-35

Synthesis Example of Gallium Phthalocyanine Compound Represented by Following Chemical Structure

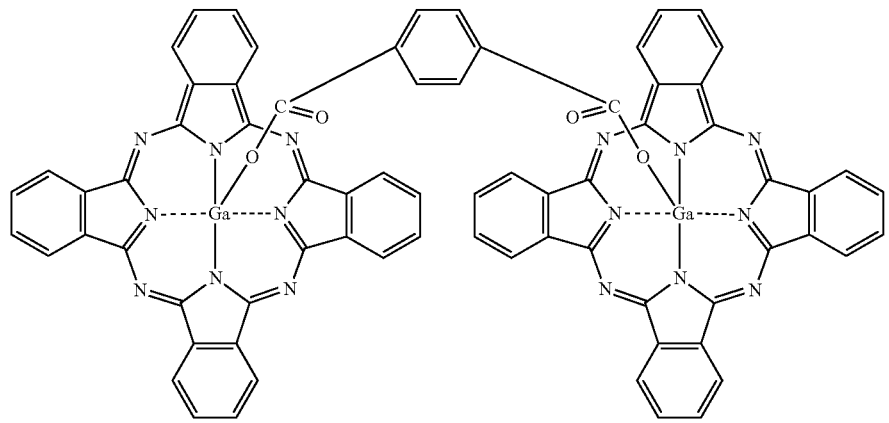

1.20 parts of hydroxygallium phthalocyanine and 0.16 parts of terephthalic acid are added to a liquid mixture of 100 ml of methylethyl ketone and 50 ml of N,N-dimethylformamide to conduct reaction at 100° C. for seven hours.

The thus-obtained crystal is washed with a liquid mixture of 50 ml of methylethylketone and 50 ml of N,N-dimethylformamide, then methylethylketone, and deionized water. Subsequent to drying, 1.27 parts (95%) of gallium phthalocyanine compound crystal is obtained.

Judging from the analysis result of the product obtained as described above by infrared absorption spectrum (KBr tablet method), absorption at a wavelength of about 3480 cm$^{-1}$ deriving from OH group disappears and absorption at 1658 cm$^{-1}$ based on C=O stretching vibration is observed.

Furthermore, m/z: 1326.06 (theoretical value: 1326.16: $C_{72}H_{36}Ga_2N_{16}O_4$) is obtained by laser desorption/ionization time-of-flight mass spectrometry (LDI-TOFMS) (positive).

The result of the element analysis of the crystal is shown in Table 35.

Judging from these results, the crystal is confirmed to be a gallium phthalocyanine compound represented by the chemical structure illustrated above.

TABLE 35

|  | C | H | N |
|---|---|---|---|
| Calculated value (%) | 65.09 | 2.73 | 16.87 |
| Actual Value (%) | 65.1 | 2.4 | 16.6 |

Synthesis Example II-1

Synthesis Example of Gallium Phthalocyanine Compound Represented by Following Chemical Structure

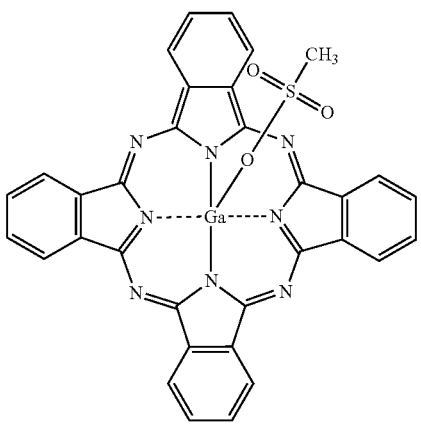

1.24 parts of chlorogallium phthalocyanine and 3.8 parts of methane sulfonic acid are added to 100 ml of dimethylsulfoxide and heated to 110° C. for a 9-hour reaction. Subsequent to cooling down to room temperature, the undissolved portion (minute amount) is removed by filtration.

About 150 ml of distilled water is added to the obtained solution followed by stirring at room temperature for three hours.

The thus-obtained crystal is filtered and washed with deionized water followed by drying to obtain 1.25 parts (92%) of gallium phthalocyanine compound crystal.

Part of The thus-obtained compound is re-crystallized with N,N-dimethyl formamide followed by the following analysis. Furthermore, m/z: 676.19 (theoretical value: 676.06: $C_{33}H_{19}GaN_8O_3S$) is obtained by matrix-assisted laser desorption/ionization time-of-flight mass spectrometry (LDI-TOFMS) (negative).

The result of the element analysis of the crystal is shown in Table 36.

Judging from these results, the crystal is confirmed to be a gallium phthalocyanine compound represented by the chemical structure illustrated above.

TABLE 36

|  | C | H | N | S |
|---|---|---|---|---|
| Calculated value (%) | 58.52 | 2.83 | 16.54 | 4.73 |
| Actual Value (%) | 58.4 | 2.9 | 16.3 | 4.5 |

Synthesis Example II-2

Synthesis Example of Gallium Phthalocyanine Compound Similar to Synthesis Example I-1

A gallium phthalocyanine is manufactured as follows. In Synthesis Example II-2, dimethylsulfoxide used in Synthesis Example II-1 is replaced with chlorobenzene and the reaction is conducted at 60° C. for five hours.

Subsequent to cooling down to room temperature, a chlorobenzene layer is removed to obtain a black layer. Tetrahydrofuran and then deionized water are added to the black layer followed by a two-hour stirring at room temperature.

Thereafter, the resultant is processed in the same manner as in Synthesis Example II-1 and 1.19 parts (88%) of gallium phthalocyanine compound is obtained.

Judging from the analysis result of the product obtained as described above by infrared absorption spectrum (KBr tablet method), The thus-obtained spectrum is confirmed to be the same as that obtained in Synthesis Example II-1.

Synthesis Example II-3

Synthesis Example of Gallium Phthalocyanine Compound Similar to Synthesis Example II-1

2.47 parts of chlorogallium phthalocyanine and 15.4 parts of methane sulfonic acid are added to 100 ml of methylethylketone followed by reflux for 7.5 hours.

Subsequent to cooling down to room temperature, about 150 ml of distilled water is added to the obtained solution followed by stirring at room temperature for four hours.

The thus-obtained crystal is filtered and washed with deionized water followed by drying to obtain 2.54 parts (94%) of gallium phthalocyanine compound crystal.

Judging from the analysis result of the product obtained as described above by infrared absorption spectrum (KBr tablet method), The thus-obtained spectrum is confirmed to be the same as that obtained in Synthesis Example II-1.

Synthesis Example II-4

Synthesis Example of Gallium Phthalocyanine Compound Similar to Synthesis Example II-1

2.47 parts of chlorogallium phthalocyanine and 30 parts of methane sulfonic acid are added to 100 ml of N,N-dimethylformamide followed by reflux for 19 hours.

Subsequent to cooling down to room temperature, about 150 ml of distilled water is added to the obtained solution followed by stirring at room temperature for four hours.

The thus-obtained crystal is filtered and washed with deionized water followed by drying to obtain 2.32 parts (86%) of gallium phthalocyanine compound crystal.

Judging from the analysis result of the product obtained as described above by infrared absorption spectrum (KBr tablet method), The thus-obtained spectrum is confirmed to be the same as that obtained in Synthesis Example II-1.

Synthesis Example II-5

Synthesis Example of Gallium Phthalocyanine Compound Represented by Following Chemical Structure

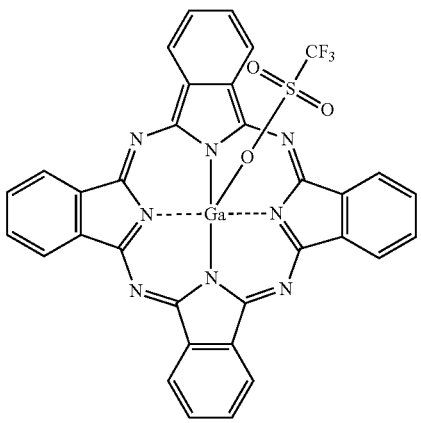

1.24 parts of chlorogallium phthalocyanine and 6.0 parts of methane sulfonic acid are added to 100 ml of dimethylsulfoxide and heated to 110° C. for a 7-hour reaction.

Subsequent to cooling down to room temperature, the undissolved portion (minute amount) is removed by filtration.

About 100 ml of distilled water is added to the obtained solution followed by stirring at room temperature for three hours.

The thus-obtained crystal is filtered and washed with deionized water followed by drying to obtain 1.43 parts (98%) of gallium phthalocyanine compound.

Part of The thus-obtained compound is re-crystallized with N,N-dimethyl formamide followed by the following analysis. Furthermore, m/z: 730.07 (theoretical value: 730.03: $C_{33}H_{16}F_3GaN_8O_3S$) is obtained by matrix-assisted laser desorption/ionization time-of-flight mass spectrometry (LDI-TOFMS) (negative).

The result of the element analysis of the crystal is shown in Table 37.

Judging from these results, the crystal is confirmed to be a gallium phthalocyanine compound represented by the chemical structure illustrated above.

TABLE 37

|  | C | H | N |
|---|---|---|---|
| Calculated value (%) | 54.20 | 2.21 | 15.32 |
| Actual Value (%) | 54.4 | 2.0 | 15.2 |

Synthesis Example II-6

Synthesis Example of Gallium Phthalocyanine Compound Similar to Synthesis Example II-5

A gallium phthalocyanine is manufactured as follows. In Synthesis Example II-6, dimethylsulfoxide used in Synthesis Example II-5 is replaced with chlorobenzene and the reaction is conducted at 50° C. for six hours.

Subsequent to cooling down to room temperature, a chlorobenzene layer is removed to obtain a black layer. Tetrahydrofuran and then deionized water are added to the black layer followed by a two-hour stirring at room temperature.

Thereafter, the resultant is processed in the same manner as in Synthesis Example II-5 and 1.18 parts (82%) of gallium phthalocyanine compound is obtained.

Judging from the analysis result of the product obtained as described above by infrared absorption spectrum (KBr tablet method), The thus-obtained spectrum is confirmed to be the same as that obtained in Synthesis Example II-5.

Synthesis Example II-7

Synthesis Example of Gallium Phthalocyanine Compound Represented by Following Chemical Structure

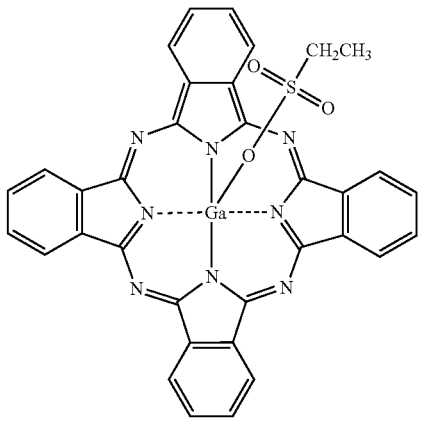

2.47 parts of chlorogallium phthalocyanine and 17.6 parts of ethane sulfonic acid are added to 150 ml of dimethylsulfoxide and heated to 110° C. for an 8-hour reaction.

Subsequent to cooling down to room temperature, about 100 ml of distilled water is added to the obtained solution followed by stirring at room temperature for four hours.

The thus-obtained crystal is filtered and washed with deionized water followed by drying to obtain 2.54 parts (92%) of gallium phthalocyanine compound.

The compound is subject to the following analysis. Furthermore, m/z: 690.18 (theoretical value: 690.07: $C_{34}H_{21}GaN_8O_3S$) is obtained by matrix-assisted laser desorption/ionization time-of-flight mass spectrometry (maLDI-TOFMS) (negative).

The result of the element analysis of the crystal is shown in Table 38.

Judging from these results, the crystal is confirmed to be a gallium phthalocyanine compound represented by the chemical structure illustrated above.

TABLE 38

|  | C | H | N | S |
|---|---|---|---|---|
| Calculated value (%) | 59.07 | 3.06 | 16.21 | 4.64 |
| Actual Value (%) | 59.0 | 3.4 | 16.0 | 4.4 |

Synthesis Example II-8

Synthesis Example of Gallium Phthalocyanine Compound Represented by Following Chemical Structure

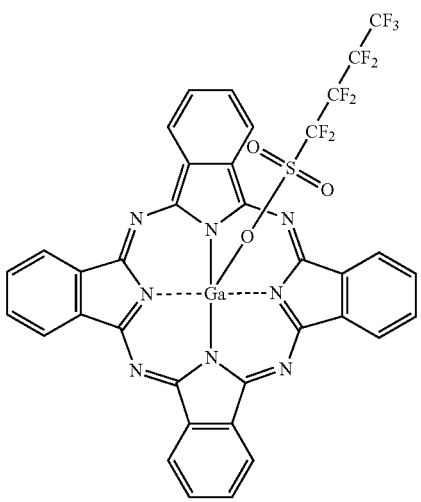

1.24 parts of chlorogallium phthalocyanine and 6.0 parts of nonafluoro-1-butane sulfonic acid are added to 100 ml of dimethylsulfoxide and heated to 110° C. for a 7-hour reaction. Subsequent to cooling down to room temperature, the undissolved portion (minute amount) is removed by filtration. About 100 ml of distilled water is added to the obtained solution followed by stirring at room temperature for four hours.

The thus-obtained crystal is filtered and washed with deionized water followed by drying to obtain 1.67 parts (95%) of gallium phthalocyanine compound.

The compound is subject to the following analysis. Furthermore, m/z: 879.97 (theoretical value: 880.02: $C_{36}H_{16}F_9GaN_8O_3S$) is obtained by matrix-assisted laser desorption/ionization time-of-flight mass spectrometry (LDI-TOFMS) (negative).

The result of the element analysis of the crystal is shown in Table 39.

Judging from these results, the crystal is confirmed to be a gallium phthalocyanine compound represented by the chemical structure illustrated above.

TABLE 39

|  | C | H | N | F |
|---|---|---|---|---|
| Calculated value (%) | 49.06 | 1.83 | 12.71 | 19.40 |

TABLE 39-continued

|  | C | H | N | F |
|---|---|---|---|---|
| Actual Value (%) | 48.8 | 1.6 | 12.9 | 19.6 |

Synthesis Example II-9

Synthesis Example of Gallium Phthalocyanine Compound Represented by Following Chemical Structure

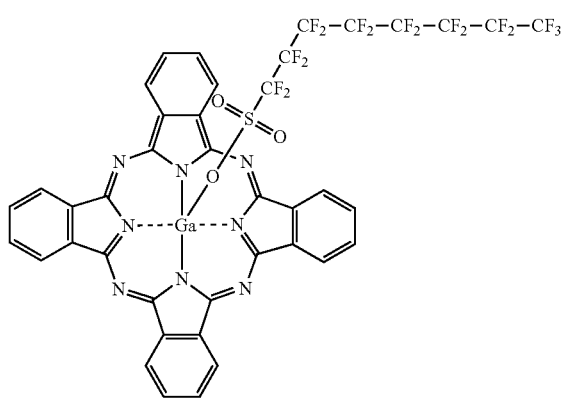

1.24 parts of chlorogallium phthalocyanine and 20.0 parts of heptadecafluoro sulfonic acid are added to 100 ml of dimethylsulfoxide and heated to 110° C. for a 7-hour reaction. Subsequent to cooling down to room temperature, the undissolved portion (minute amount) is removed by filtration.

About 150 ml of distilled water is added to the obtained solution followed by stirring at room temperature for six hours.

The thus-obtained crystal is filtered and washed with deionized water followed by drying to obtain 1.94 parts (90%) of gallium phthalocyanine compound.

The compound is subject to the following analysis.

Furthermore, m/z: 1079.92 (theoretical value: 1080.01: $C_{40}H_{16}F_{17}GaN_8O_3S$) is obtained by matrix-assisted laser desorption/ionization time-of-flight mass spectrometry (LDI-TOFMS) (positive).

The result of the element analysis of the crystal is shown in Table 40.

Judging from these results, the crystal is confirmed to be a gallium phthalocyanine compound represented by the chemical structure illustrated above.

TABLE 40

|  | C | H | N | F |
|---|---|---|---|---|
| Calculated value (%) | 44.43 | 1.49 | 10.36 | 29.87 |

TABLE 40-continued

|  | C | H | N | F |
|---|---|---|---|---|
| Actual Value (%) | 44.6 | 1.3 | 10.1 | 29.9 |

Synthesis Example II-10

Synthesis Example of Gallium Phthalocyanine Compound Represented by Following Chemical Structure

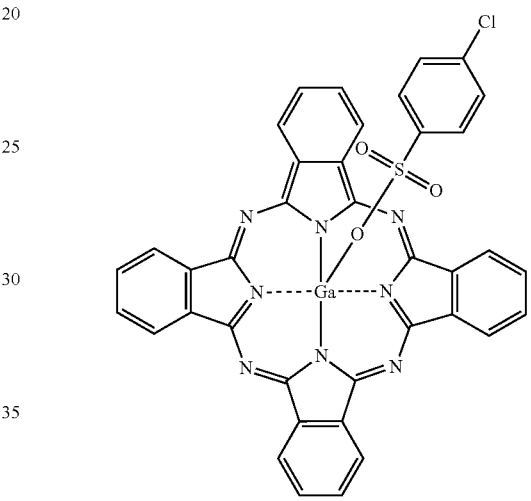

1.24 parts of chlorogallium phthalocyanine and 23 parts of p-chlorobenzene sulfonic acid are added to 100 ml of dimethylsulfoxide and heated to 110° C. for a 9-hour reaction.

Subsequent to cooling down to room temperature, the undissolved portion (minute amount) is removed by filtration.

About 150 ml of distilled water is added to the obtained solution followed by stirring at room temperature for six hours.

The thus-obtained crystal is filtered and washed with deionized water followed by drying to obtain 1.45 parts (94%) of gallium phthalocyanine compound.

The compound is subject to the following analysis.

Furthermore, m/z: 772.06 (theoretical value: 772.03: $C_{38}H_{20}ClGaN_8O_3S$) is obtained by matrix-assisted laser desorption/ionization time-of-flight mass spectrometry (LDI-TOFMS) (negative).

The result of the element analysis of the crystal is shown in Table 41.

Judging from these results, the crystal is confirmed to be a gallium phthalocyanine compound represented by the chemical structure illustrated above.

TABLE 41

| | C | H | N | S |
|---|---|---|---|---|
| Calculated value (%) | 58.98 | 2.60 | 14.48 | 4.14 |
| Actual Value (%) | 58.7 | 2.5 | 14.5 | 3.9 |

Synthesis Example II-11

Synthesis Example of Gallium Phthalocyanine Compound Represented by Following Chemical Structure

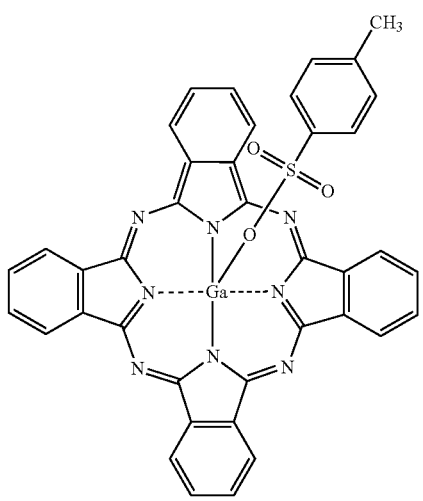

0.48 parts of hydroxygallium phthalocyanine and 2.8 parts of a monohydrate of p-toluene sulfonic acid are added to 100 ml of toluene and heated to 80° C. for a 6-hour reaction.

The thus-obtained crystal is filtered and washed with deionized water followed by drying to obtain 0.53 parts (88%) of gallium phthalocyanine compound. The compound is subject to the following analysis.

Judging from the analysis result of the product obtained as described above by infrared absorption spectrum (KBr tablet method), a wavelength of 3480 cm$^{-1}$ deriving from OH group is confirmed to have disappeared.

Furthermore, m/z: 752.05 (theoretical value: 752.09: $C_{39}H_{23}GaN_8O_3S$) is obtained by matrix-assisted laser desorption/ionization time-of-flight mass spectrometry (LDI-TOFMS) (negative) (positive).

The result of the element analysis of the crystal is shown in Table 42.

Judging from these results, the crystal is confirmed to be a gallium phthalocyanine compound represented by the chemical structure illustrated above.

TABLE 42

| | C | H | N | S |
|---|---|---|---|---|
| Calculated value (%) | 62.17 | 3.08 | 14.87 | 4.26 |
| Actual Value (%) | 61.7 | 3.3 | 14.4 | 4.1 |

Synthesis Example II-12

Synthesis Example of Gallium Phthalocyanine Compound Represented by Following Chemical Structure

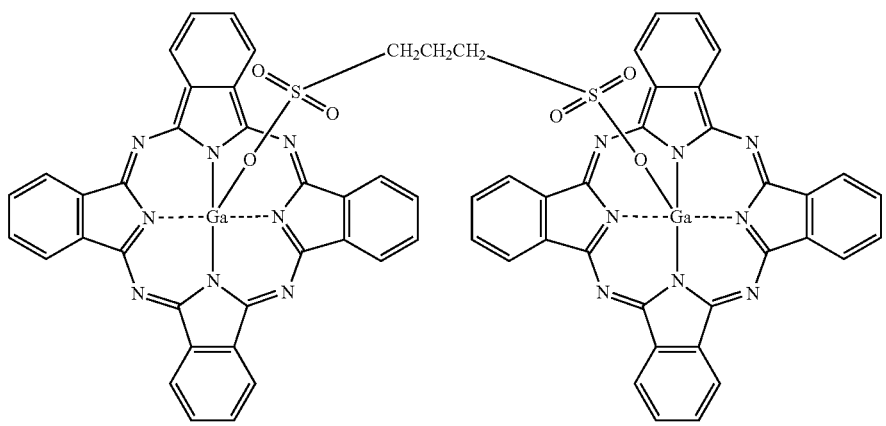

0.60 parts of hydroxygallium phthalocyanine and 0.20 parts of 1,3-propane disulfonic acid (50% to 60% aqueous solution) are added to 100 ml of dimethylsulfoxide and heated to 100° C. for a 7-hour reaction.

Subsequent to cooling down to room temperature, the undissolved portion (minute amount) is removed by filtration.

About 150 ml of distilled water is added to the obtained solution followed by stirring at room temperature for six hours.

The thus-obtained crystal is filtered and washed with deionized water followed by drying to obtain 0.58 parts (85%) of gallium phthalocyanine compound.

The compound is subject to the following analysis.

Judging from the analysis result of the product obtained as described above by infrared absorption spectrum (KBr tablet method), about 3480 cm$^{-1}$ deriving from OH group is confirmed to have disappeared.

The result of the element analysis of the crystal is shown in Table 43.

Judging from these results, the crystal is confirmed to be a gallium phthalocyanine compound represented by the chemical structure illustrated above.

TABLE 43

|  | C | H | N | S |
|---|---|---|---|---|
| Calculated value (%) | 58.88 | 2.80 | 16.40 | 4.69 |
| Actual Value (%) | 58.3 | 2.6 | 16.1 | 4.3 |

Synthesis Example II-13

Synthesis Example of Gallium Phthalocyanine Compound Represented by Following Chemical Structure

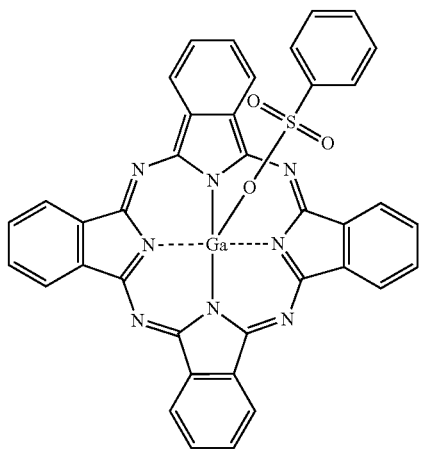

1.20 parts of hydroxygallium phthalocyanine and 17.62 parts of a monohydrate of benzene sulfonic acid are added to a liquid mixture of 100 ml of 2-butanone and 50 ml of N,N-dimethylformamide to conduct reaction at 90° C. for seven hours.

The thus-obtained crystal is filtered and washed with 2-butanone and then deionized water followed by drying to obtain 0.92 parts (62%) of gallium phthalocyanine compound.

The compound is subject to the following analysis. Judging from the analysis result of the product obtained as described above by infrared absorption spectrum (KBr tablet method), about 3480 cm$^{-1}$ deriving from OH group is confirmed to have disappeared.

Furthermore, m/z: 737.99 (theoretical value: 738.07: $C_{38}H_{21}GaN_8O_3S$) is obtained by laser desorption/ionization time-of-flight mass spectrometry (LDI-TOFMS) (positive).

The result of the element analysis of the crystal is shown in Table 44.

Judging from these results, the crystal is confirmed to be a gallium phthalocyanine compound represented by the chemical structure illustrated above.

TABLE 44

|  | C | H | N | S |
|---|---|---|---|---|
| Calculated value (%) | 61.73 | 2.86 | 15.15 | 4.34 |
| Actual Value (%) | 61.5 | 2.9 | 15.0 | 4.0 |

Synthesis Example II-14

Synthesis Example of Gallium Phthalocyanine Compound Represented by Following Chemical Structure

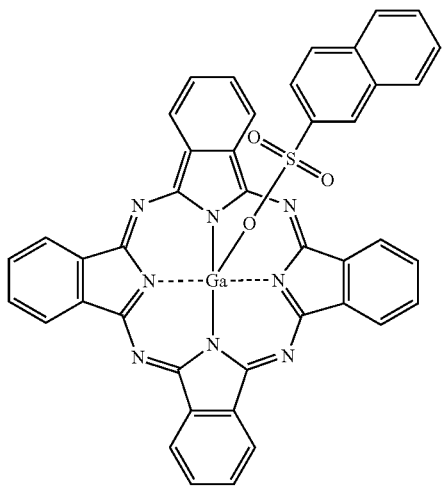

1.20 parts of hydroxygallium phthalocyanine and 22.62 parts of monohydrate of a naphthalene sulfonic acid are added to a liquid mixture of 100 ml of 2-butanone and 50 ml of N,N-dimethylformamide to conduct reaction at 90° C. for seven hours.

The thus-obtained crystal is filtered and washed with 2-butanone and then deionized water followed by drying to obtain 0.66 parts (42%) of gallium phthalocyanine compound.

The compound is subject to the following analysis.

Judging from the analysis result of the product obtained as described above by infrared absorption spectrum (KBr tablet method), about 3480 cm$^{-1}$ deriving from OH group is confirmed to have disappeared.

Furthermore, m/z: 787.99 (theoretical value: 788.09: $C_{42}H_{23}GaN_8O_3S$) is obtained by laser desorption/ionization time-of-flight mass spectrometry (LDI-TOFMS) (positive).

The result of the element analysis of the crystal is shown in Table 45.

Judging from these results, the crystal is confirmed to be a gallium phthalocyanine compound represented by the chemical structure illustrated above.

TABLE 45

|                    | C     | H    | N     | S    |
|--------------------|-------|------|-------|------|
| Calculated value (%) | 63.90 | 2.94 | 14.19 | 4.06 |
| Actual Value (%)   | 63.6  | 2.7  | 14.3  | 3.7  |

Synthesis Example II-15

Synthesis Example of Gallium Phthalocyanine Compound Represented by Following Chemical Structure

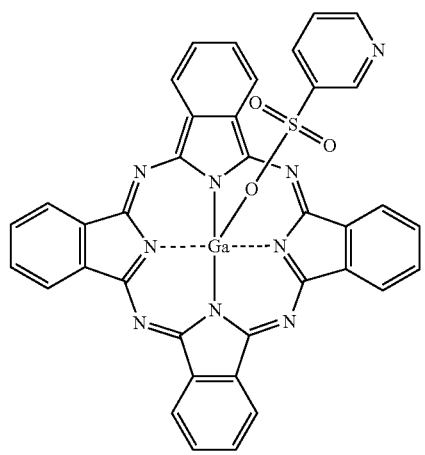

1.20 parts of hydroxygallium phthalocyanine and 15.92 parts of 3-pyridine sulfonic acid are added to a liquid mixture of 100 ml of 2-butanone and 50 ml of N,N-dimethylformamide to conduct reaction at 90° C. for seven hours.

The thus-obtained crystal is filtered and washed with 2-butanone and then deionized water followed by drying to obtain 0.96 parts (65%) of gallium phthalocyanine compound.

The compound is subject to the following analysis.

Judging from the analysis result of the product obtained as described above by infrared absorption spectrum (KBr tablet method), about 3480 cm$^{-1}$ deriving from OH group is confirmed to have disappeared.

Furthermore, m/z: 738.97 (theoretical value: 739.07: $C_{37}H_{20}GaN_9O_3S$) is obtained by laser desorption/ionization time-of-flight mass spectrometry (LDI-TOFMS) (positive).

The result of the element analysis of the crystal is shown in Table 46.

Judging from these results, the crystal is confirmed to be a gallium phthalocyanine compound represented by the chemical structure illustrated above.

TABLE 46

|                    | C     | H    | N     | S    |
|--------------------|-------|------|-------|------|
| Calculated value (%) | 60.02 | 2.72 | 17.03 | 4.33 |
| Actual Value (%)   | 60.4  | 2.5  | 17.2  | 4.1  |

Example 1

A liquid application of intermediate layer having the following recipe is applied to an aluminum cylinder having a length of 346 mm and a diameter of 40 mm followed by drying at 130° C. for 20 minutes to form an intermediate layer having a thickness of about 3.5 μm.

Subsequently, a liquid application of charge generation layer having the following recipe is subject to ball-mill dispersion using zirconia balls having a diameter of 5 mm for two hours. Subsequent to application of the liquid application to the intermediate layer, the liquid application is dried at 90° C. for 10 minutes to form a charge generation layer having a thickness of about 0.3 μm. A liquid application of charge transport layer having the following recipe is applied to the charge generation layer followed by drying at 130° C. for 20 minutes to form a charge transport layer having a thickness of about 25 μm. Thus, an image bearing member is manufactured. Dip coating is used for the application of each layer.

| Liquid Application of Intermediate Layer | |
|---|---|
| Titanium oxide (CR-EL, manufactured by ISHIHARA SANGYO KAISHA, LTD): | 50 parts |
| Alkyd resin (Beckolite M6401-50, manufactured by Dainippon Ink and Chemicals, Inc.): | 15 parts |
| Melamine resin (L-145-60, manufactured by Dainippon Ink and Chemicals, Inc.): | 8 parts |
| 2-butanone | 120 parts |
| Liquid Application of Charge Generation Layer | |
| Gallium Phthalocyanine Compound of Synthesis Example I-9: | 3 parts |
| Polyvinyl butyral {XYHL, manufactured by Union Carbide Corporation (UCC)}: | 2 parts |
| Methylethylketone: | 160 parts |
| Liquid Application of Charge Transport Layer | |
| Z type polycarbonate (PanLite TS-2050, manufactured by Teijin Chemicals Ltd.): | 10 parts |
| Charge transport compound represented by the following chemical structure: | 7 parts |
| Tetrahydrofuran: | 80 parts |
| Silicone oil (KF50-100cs, manufactured by Shin-Etsu Chemical Co., Ltd.): | 0.002 parts |

Example 2

The image bearing member of Example 2 is manufactured in the same manner as in Example 1 except that gallium phthalocyanine compound is changed to gallium phthalocyanine of Synthesis Example I-14.

Example 3

The image bearing member of Example 3 is manufactured in the same manner as in Example 1 except that gallium phthalocyanine compound is changed to gallium phthalocyanine of Synthesis Example I-21.

Example 4

The image bearing member of Example 4 is manufactured in the same manner as in Example 1 except that gallium phthalocyanine compound is changed to gallium phthalocyanine of Synthesis Example I-22.

Example 5

The image bearing member of Example 5 is manufactured in the same manner as in Example 1 except that gallium phthalocyanine compound is changed to gallium phthalocyanine of Synthesis Example I-23.

Example 6

The image bearing member of Example 6 is manufactured in the same manner as in Example 1 except that gallium phthalocyanine compound is changed to gallium phthalocyanine of Synthesis Example I-24.

Example 7

The image bearing member of Example 7 is manufactured in the same manner as in Example 1 except that gallium phthalocyanine compound is changed to gallium phthalocyanine of Synthesis Example I-25.

Example 8

The image bearing member of Example 8 is manufactured in the same manner as in Example 1 except that gallium phthalocyanine compound is changed to gallium phthalocyanine of Synthesis Example I-30.

Example 9

The image bearing member of Example 9 is manufactured in the same manner as in Example 1 except that gallium phthalocyanine compound is changed to gallium phthalocyanine of Synthesis Example II-10.

Example 10

The image bearing member of Example 10 is manufactured in the same manner as in Example 1 except that gallium phthalocyanine compound is changed to gallium phthalocyanine of Synthesis Example II-11.

The thus manufactured image bearing members are installed into a digital full color multi-functional machine remodeled based on imagio MPC5000 such the writing LD wavelength of the image bearing member is 780 nm.

The application voltage for the charging member is set in such a manner that the charging voltage at non-irradiated portion of the image bearing member is −700 V as the processing condition for the following test. The development bias is set to be −500 V. The machine test is conducted with a run length of 10,000 A4 sheets using a chart with a writing ratio of 6% (characters occupying 6% of the entire of an A4 sheet are evenly written).

The test environment is room temperature and normal humidity.

The voltage at the dark portion and the bright portion and the image quality are evaluated at an initial state and after printing 10,000 sheets.

The evaluation method is as follows.

The results are shown in Table 47.

Voltage at dark portion: the surface voltage of the image bearing member is measured when moved to the development position after charging.

The application voltage of the charger is adjusted such that the voltage of the image bearing member before printing is −700 V and maintained until the test is complete. Voltage at bright portion: the surface voltage of the image bearing member is measured when moved to the development position after charging and irradiation for all over the surface.

Image quality: Reproducibility of color is evaluated for ISO/JIS-SCID image N1 (portrait) at an initial state and after image printing of 10,000 sheets.

The color reproducibility is evaluated according to three levels of G (good), F (fair), and B (bad).

TABLE 47

|  | Initial | | | After printing 10,000 sheets | | |
| --- | --- | --- | --- | --- | --- | --- |
|  | Voltage at dark portion | Voltage at bright portion | Image quality | Voltage at dark portion | Voltage at bright portion | Image quality |
| Example 1 | −700 V | −120 V | G | −680 V | −150 V | G |
| Example 2 | −700 V | −90 V | G | −695 V | −120 V | G |
| Example 3 | −700 V | −110 V | G | −690 V | −140 V | G |
| Example 4 | −700 V | −130 V | G | −690 V | −160 V | G |
| Example 5 | −700 V | −70 V | G | −695 V | −95 V | G |
| Example 6 | −700 V | −60 V | G | −695 V | −85 V | G |
| Example 7 | −700 V | −100 V | G | −695 V | −130 V | G |
| Example 8 | −700 V | −80 V | G | −685 V | −100 V | G |
| Example 9 | −700 V | −55 V | G | −630 V | −70 V | G |
| Example 10 | −700 V | −90 V | G | −600 V | −115 V | G |

This document claims priority and contains subject matter related to Japanese Patent Applications nos. 2010-039153 and 2010-038930, filed on Feb. 24, 2010, and Feb. 24, 2010, respectively, the entire contents of which are hereby incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An image bearing member comprising:
   an electroconductive substrate; and
   a photosensitive layer provided overlying the electroconductive substrate, comprising a charge generation material comprising a gallium phthalocyanine compound represented by the following chemical structure I,

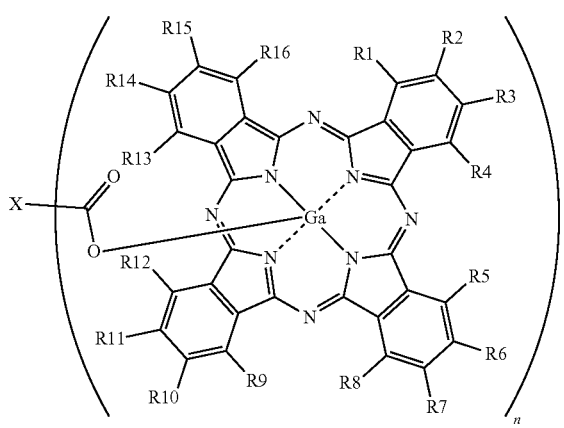

wherein X represents a substituted or non-substituted alkyl group, a substituted or non-substituted alkenyl group, a substituted or non-substituted alkynyl group, a substituted or non-substituted aralkyl group, a substituted or non-substituted cycloalkyl group, a substituted or non-substituted aryl group, or a hydrogen atom, substitution groups thereof are an alkoxy group, an alkylthio group, an alkyl group, a halogen atom, a nitro group, an amino group, an aryl group, a carboxylic group, and a cyano group, R1 to R16 independently represent a hydrogen atom, an alkoxy group, an alkylthio group, an alkyl group, a halogen atom, a nitro group, or an aryl group, and n represents an integer of from 1 to 3 but excluding a combination in which n is 1 and X is methyl group.

2. The image bearing member according to claim 1, wherein the charge generation material is obtained by reacting a halogenized gallium phthalocyanine or a hydroxy gallium phthalocyanine and a carboxylic acid derivative.

3. An image forming method comprising:
charging the image bearing member of claim 1;
irradiating the image bearing member with light according to image data to form a latent electrostatic image on the image bearing member;
developing the latent electrostatic image with a development agent comprising toner to obtain a visualized image; and
transferring the visualized image onto a recording medium.

4. An image forming apparatus comprising:
the image bearing member of claim 1;
a charger that charges the image bearing member;
an irradiator that irradiates the image bearing member with light to form a latent electrostatic image on a surface of the image bearing member;
a development device that develops the latent electrostatic image with a development agent comprising toner to obtain a visualized image; and
a transfer device that transfers the visualized image onto a recording medium.

5. A process cartridge comprising:
the image bearing member of claim 1; and
at least one of a charger, an irradiator, a development device, and a cleaner.

6. An image bearing member comprising:
an electroconductive substrate; and
a photosensitive layer provided overlying the electroconductive substrate, comprising a charge generation material comprising a gallium phthalocyanine compound represented by the following chemical structure II,

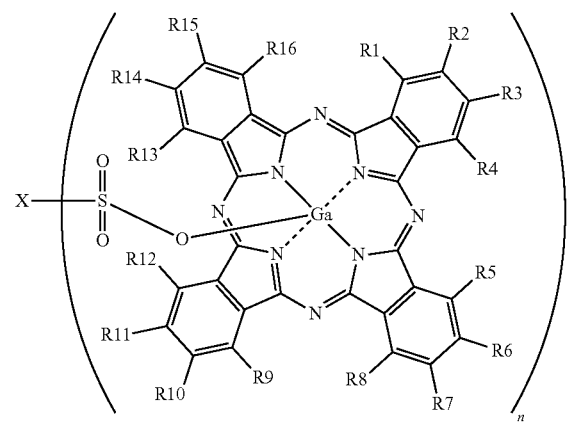

wherein X represents a substituted or non-substituted alkyl group, a substituted or non-substituted alkenyl group, a substituted or non-substituted alkynyl group, a substituted or non-substituted aralkyl group, or a substituted or non-substituted aryl group, substitution groups thereof are an alkoxy group, an alkylthio group, an alkyl group, a halogen atom, a nitro group, an amino group, an aryl group, a carboxylic group, and a cyano group, R1 to R16 independently represent a hydrogen atom, an alkoxy group, an alkylthio group, an alkyl group, a halogen atom, a nitro group, or an aryl group, and n represents an integer of from 1 or 2.

7. The image bearing member according to claim 6, wherein the charge generation material is obtained by reacting a halogenized gallium phthalocyanine or a hydroxy gallium phthalocyanine and a carboxylic acid derivative.

8. An image forming method comprising:
charging the image bearing member of claim 6;
irradiating the image bearing member with light according to image data to form a latent electrostatic image on the image bearing member;
developing the latent electrostatic image with a development agent comprising toner to obtain a visualized image; and
transferring the visualized image onto a recording medium.

9. An image forming apparatus comprising:
the image bearing member of claim 6;
a charger that charges the image bearing member;
an irradiator that irradiates the image bearing member with light to form a latent electrostatic image on a surface of the image bearing member;
a development device that develops the latent electrostatic image with a development agent comprising toner to obtain a visualized image; and
a transfer device that transfers the visualized image onto a recording medium.

10. A process cartridge comprising:
the image bearing member of claim 6; and
at least one of a charger, an irradiator, a development device, and a cleaner.

11. The image bearing member as claimed in claim 1, wherein said photosensitive layer comprises a charge generation material comprising a gallium phthalocyanine compound represented by the following chemical structure I-A

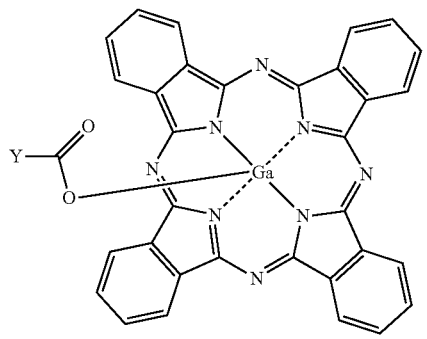

wherein Y represents a substituted or non-substituted alkyl group excluding methyl, a substituted or non-substituted alkenyl group, a substituted or non-substituted alkynyl group, a substituted or non-substituted aralkyl group, a substituted or non-substituted cycloalkyl group, a substituted or non-substituted aryl group, or a hydrogen atom.

12. The image bearing member as claimed in claim 6, wherein said photosensitive layer comprises a charge generation material comprising a gallium phthalocyanine compound represented by the following chemical structure II-A

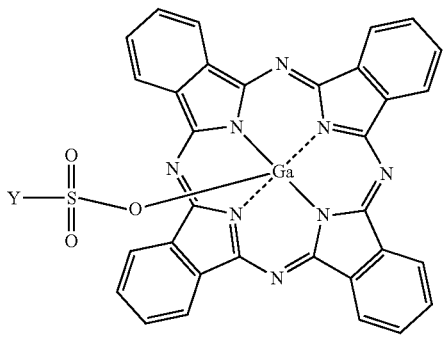

wherein Y represents a substituted or non-substituted alkyl group, a substituted or non-substituted alkenyl group, a substituted or non-substituted alkynyl group, a substituted or non-substituted aralkyl group, or a substituted or non-substituted aryl group.

\* \* \* \* \*